US012717260B2

(12) United States Patent
Nakata et al.

(10) Patent No.: US 12,717,260 B2
(45) Date of Patent: Aug. 25, 2026

(54) IMAGE FORMING APPARATUS HAVING A TONER SUPPLYING OPERATION

(71) Applicant: CANON KABUSHIKI KAISHA, Tokyo (JP)

(72) Inventors: Keitaro Nakata, Shizuoka (JP); Takuya Oka, Kanagawa (JP); Hisashi Taniguchi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 18/772,688

(22) Filed: Jul. 15, 2024

(65) Prior Publication Data

US 2025/0068112 A1 Feb. 27, 2025

(30) Foreign Application Priority Data

Aug. 25, 2023 (JP) ................................ 2023-137616

(51) Int. Cl.
*G03G 15/08* (2006.01)
*G03G 15/00* (2006.01)
*G03G 21/20* (2006.01)

(52) U.S. Cl.
CPC ....... *G03G 15/556* (2013.01); *G03G 15/0856* (2013.01); *G03G 15/5016* (2013.01); *G03G 21/203* (2013.01)

(58) Field of Classification Search
CPC ........... G03G 15/0856; G03G 15/0862; G03G 15/0865; G03G 15/0877; G03G 15/55;
(Continued)

(56) References Cited

U.S. PATENT DOCUMENTS 11,215,939 B2 1/2022 Ajima
11,681,240 B2 6/2023 Ajima
(Continued)

FOREIGN PATENT DOCUMENTS

JP 2020-154302 A 9/2020
JP 2021-067835 A 4/2021
(Continued)

OTHER PUBLICATIONS

Shingo Ito et al., U.S. Appl. No. 18/796,495, filed Aug. 7, 2024.

*Primary Examiner* — Robert B Beatty
(74) *Attorney, Agent, or Firm* — VENABLE LLP

(57) ABSTRACT

An image forming apparatus capable of performing a supplying operation for supplying toner from a supply container detachably mountable thereto includes an image bearing member, a developing member, a developing container, a detecting portion, a notifying portion, and a controller for carrying out control so as to cause the notifying portion to notify a timing to perform a toner supplying operation when a toner amount detected by the detecting portion is smaller than a threshold. The controller carries out control so as to set the threshold to a first threshold in a case where a print ratio after the last supplying operation is a predetermined print ratio or more and to set the threshold to a second threshold higher than the first threshold in a case where the print ratio is less than the predetermined print ratio.

8 Claims, 15 Drawing Sheets

(58) Field of Classification Search
CPC ............... G03G 15/556; G03G 21/203; G03G 2215/066; G03G 2215/0888; G03G 2215/0891; G03G 2215/0894; G03G 15/5016
USPC .................. 399/27, 43, 44, 61, 81, 258, 262
See application file for complete search history.

(56) References Cited

U.S. PATENT DOCUMENTS

| | | | | |
|---|---|---|---|---|
| 2009/0297177 A1* | 12/2009 | Shimizu | G03G 15/0856 399/81 |
| 2011/0222872 A1* | 9/2011 | Minamikawa | G03G 15/0856 399/258 |
| 2011/0280591 A1* | 11/2011 | Suzuki | G03G 15/556 399/254 |
| 2021/0072692 A1* | 3/2021 | Suzuki | G03G 15/556 |
| 2021/0271197 A1* | 9/2021 | Burger | G03G 15/556 |

FOREIGN PATENT DOCUMENTS

| | | |
|---|---|---|
| JP | 2021-135321 A | 9/2021 |
| JP | 2021-156968 A | 10/2021 |

* cited by examiner (a)

(b)

IMAGE FORMING APPARATUS HAVING A TONER SUPPLYING OPERATION

FIELD OF THE INVENTION AND RELATED ART

The present invention relates to a toner container mountable in an image forming apparatus for forming an image on a recording material.

In general, an image forming apparatus of an electrophotographic type forms an image by transferring a toner image, formed on a surface of a photosensitive drum, onto a transfer material as a transfer medium. Further, as a developer supplying (replenishing) type, for example, a process cartridge type or a toner container supplying type has been known. The process cartridge type is a type in which the photosensitive drum and a developing container are integrally assembled as a process cartridge and in which the process cartridge is exchanged with a new one when an amount of the developer in a developing container is below a predetermined amount. On the other hand, the toner container supplying type is a type in which the toner is supplied from a toner container, such as a toner pack or a toner bottle, to the developing container when the amount of the toner in the developing container is below the predetermined amount.

Conventionally, as the toner container supplying type, a toner pack type is proposed in Japanese Laid-Open Patent Application No. 2020-154302. In this type, when a toner amount of toner in a developing container becomes a predetermined amount or less, display prompting a user to supply the toner is made, and the user is capable of refilling the toner by supplying the toner from a toner pack for refill, in which the toner is accommodated, to the developing container. At this time, the toner amount of the toner in the developing container is detected by detecting presence/absence of the toner at a predetermined position in the developing container with a sensor or the like which is a detecting means provided on an image forming apparatus side. The image forming apparatus includes a controller (control means), and the controller (sequence) discriminates the toner amount of the toner in the developing container on the basis of a result of a detecting means.

However, as in the conventional constitution, when a cycle such that the toner is used in a toner amount to a predetermined amount and then is supplied is repeated, a fog due to the toner occurs in some cases. In conventional toner supply, new (fresh) toner is supplied to the developing container in which deteriorated toner remains. In the case where the toner is supplied, an average number of times in which a single toner particle of the toner remaining in the developing container is rubbed (hereinafter, a number of times of friction) is naturally larger than that of the toner in a new (fresh) article state.

For that reason, the toner remaining in the developing container is larger in number of times of friction than that during last supply, so that the toner which is more deteriorated remains in the developing container. The deteriorated toner is accumulated in the developing container, and therefore, as a result, there is a liability that a fog due to toner deterioration occurs in a large amount.

SUMMARY OF THE INVENTION

The present invention has been accomplished in the above-described circumferences. A principal object of the present invention is to suppress an occurrence of an image defect due to toner deterioration.

In order to solve this problem, the present invention is provided with the following constitutions.

According to an aspect of the present invention, there is provided an image forming apparatus capable of performing a supplying operation for supplying toner from a supply container detachably mountable thereto, the image forming apparatus comprising: an image bearing member configured to bear a toner image and to be rotatable; a developing member configured to supply the toner to the image bearing member; a developing container configured to accommodate the toner and provided with a supply opening through which the toner is supplied; a detecting portion configured to detect a toner amount of the toner accommodated in the developing container; a notifying portion configured to notify a timing to perform the supplying operation; and a controller configured to carry out control so as to cause the notifying portion to notify the timing to perform the supplying operation when the toner amount detected by the detecting portion is smaller than a threshold, wherein the controller carries out control so as to set the threshold to a first threshold in a case where a print ratio after the last supplying operation is a predetermined print ratio or more and to set the threshold to a second threshold higher than the first threshold in a case where the print ratio is less than the predetermined print ratio.

According to another aspect of the present invention, there is provided an image forming apparatus capable of performing a supplying operation for supplying toner from a supply container detachably mountable thereto, the image forming apparatus comprising: an image bearing member configured to bear a toner image and to be rotatable; a developing member configured to supply the toner to the image bearing member; a developing container configured to accommodate the toner and provided with a supply opening through which the toner is supplied; a detecting portion configured to detect a toner amount of the toner accommodated in the developing container; a notifying portion configured to notify a timing to perform the supplying operation; a controller configured to carry out control so as to cause the notifying portion to notify the timing to perform the supplying operation when the toner amount detected by the detecting portion is smaller than a threshold; and an environment detecting portion configured to detect a water content in an ambient environment of the image forming apparatus, wherein the controller carries out control so as to set the threshold to a first threshold in a case where the water content detected by the environment detecting portion is a predetermined water content or more and to set the threshold to a fourth threshold higher than the first threshold in a case where the water content is less than the predetermined water content.

Further features of the present invention will become apparent from the following description of exemplary embodiments with reference to the attached drawings.

Figure 2:
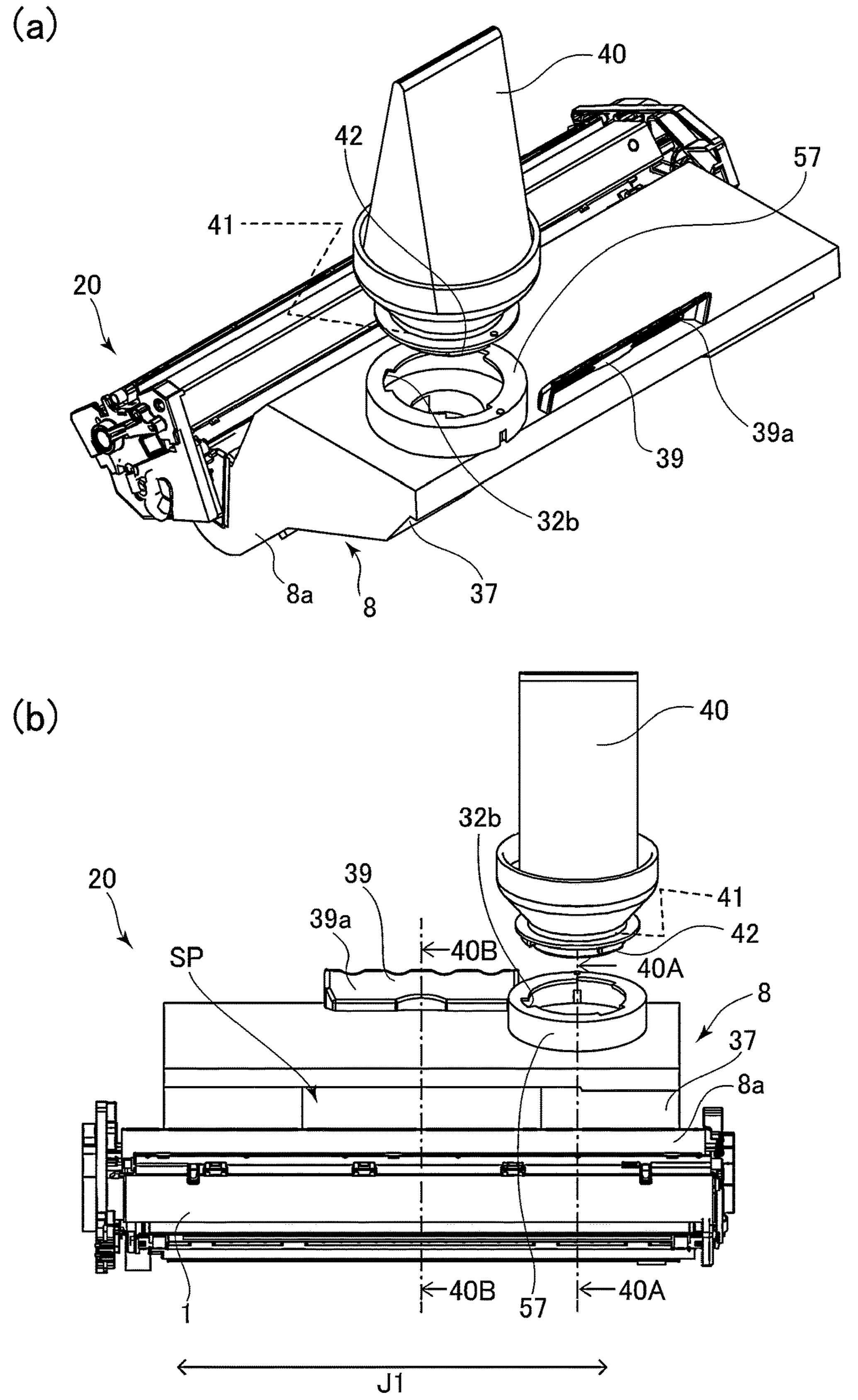

Parts (a) and (b) of FIG. 2 are a perspective view and a front view, respectively, showing a developing container and a toner pack in the embodiments 1 to 3.

Figure 3:
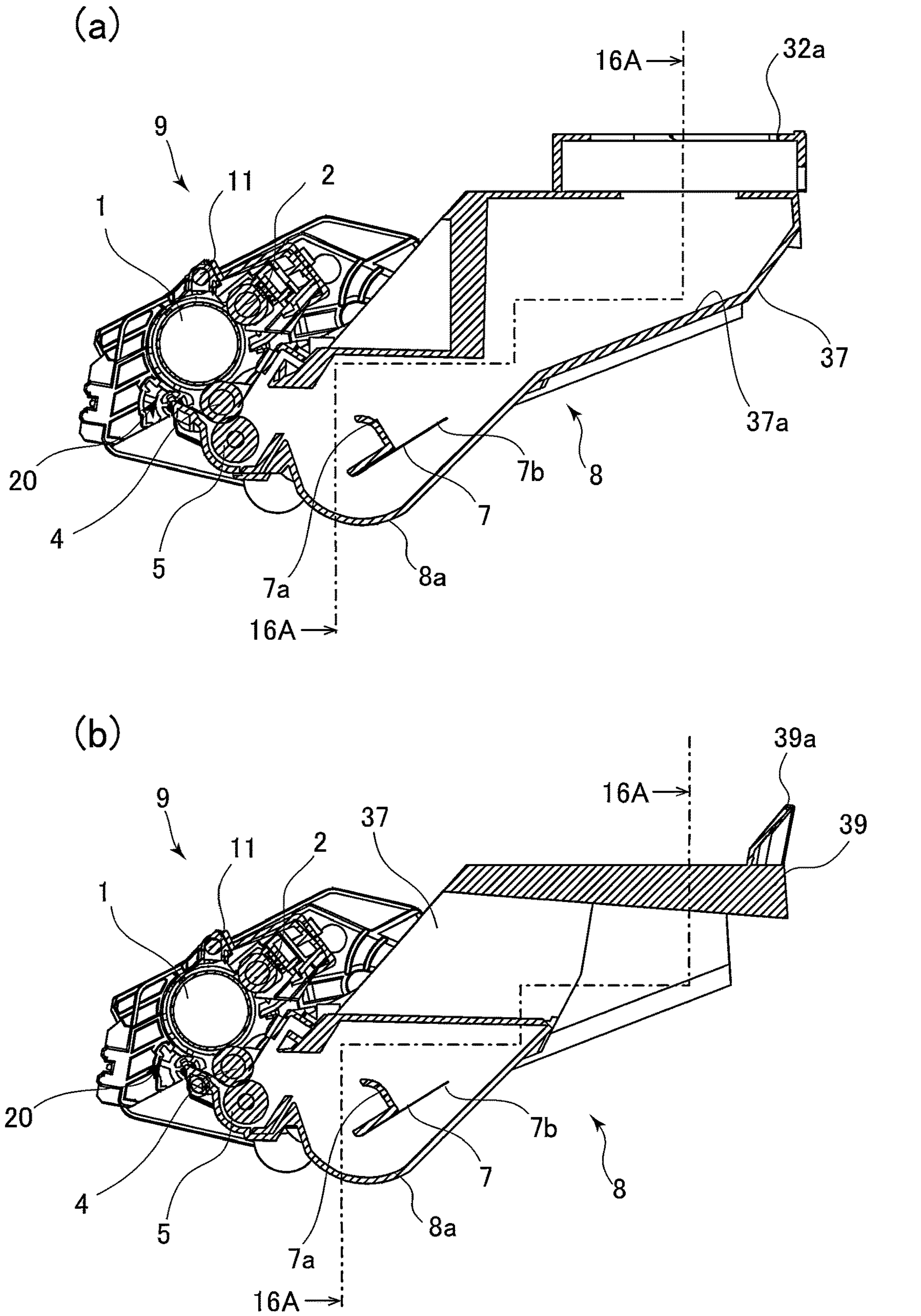

Parts (a) and (b) of FIG. 3 are sectional views taken along 40A-40A line and 40B-40B line, respectively, of FIG. 2 in the embodiments 1 to 3.

Figure 4:
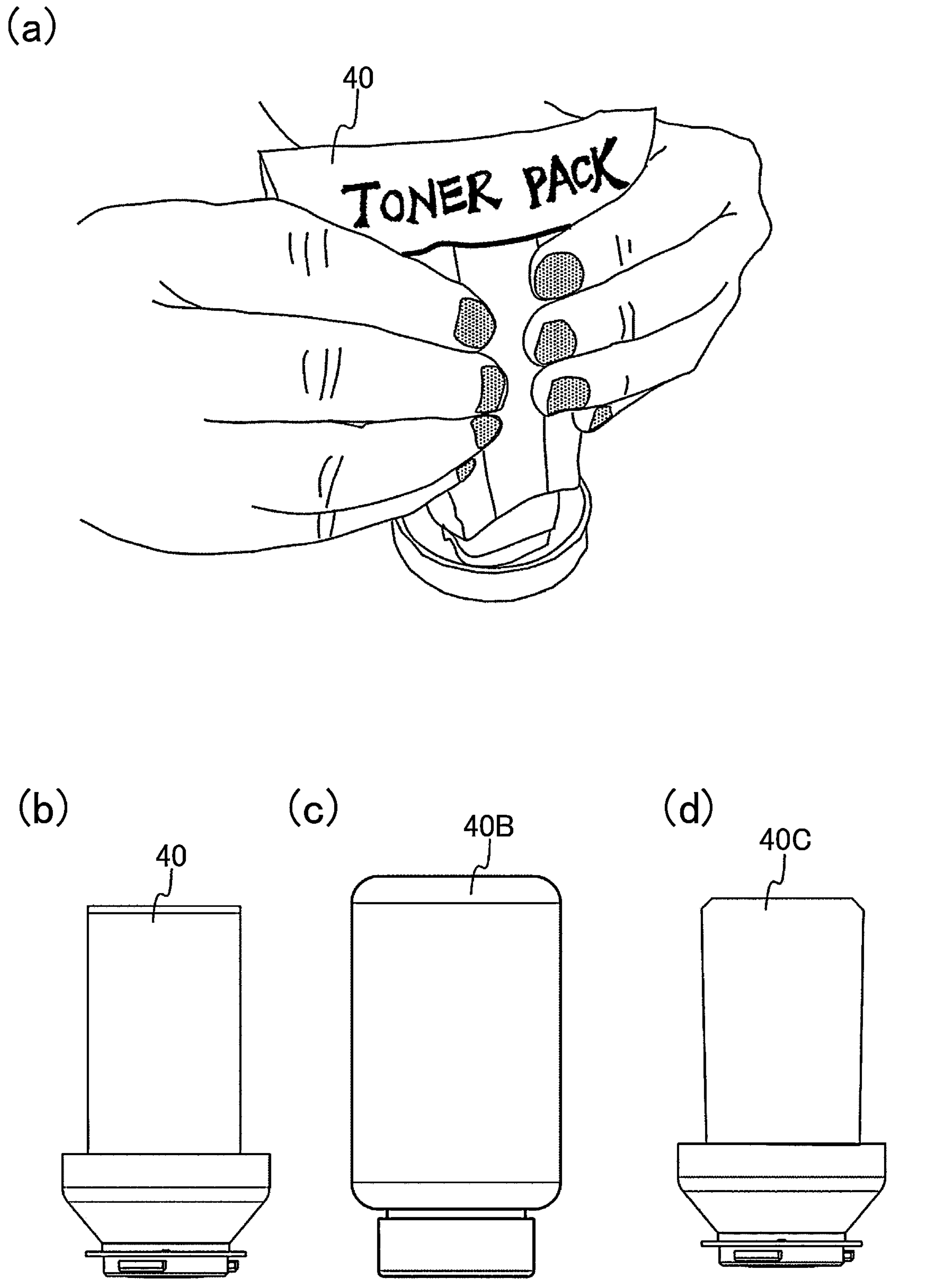

Part (a) of FIG. 4 is a perspective view showing the toner pack in the embodiments 1 to 3, and parts (b) to (d) of FIG. 4 are front views each showing a modified embodiment of the toner pack in the embodiments 1 to 3.

Figure 5:
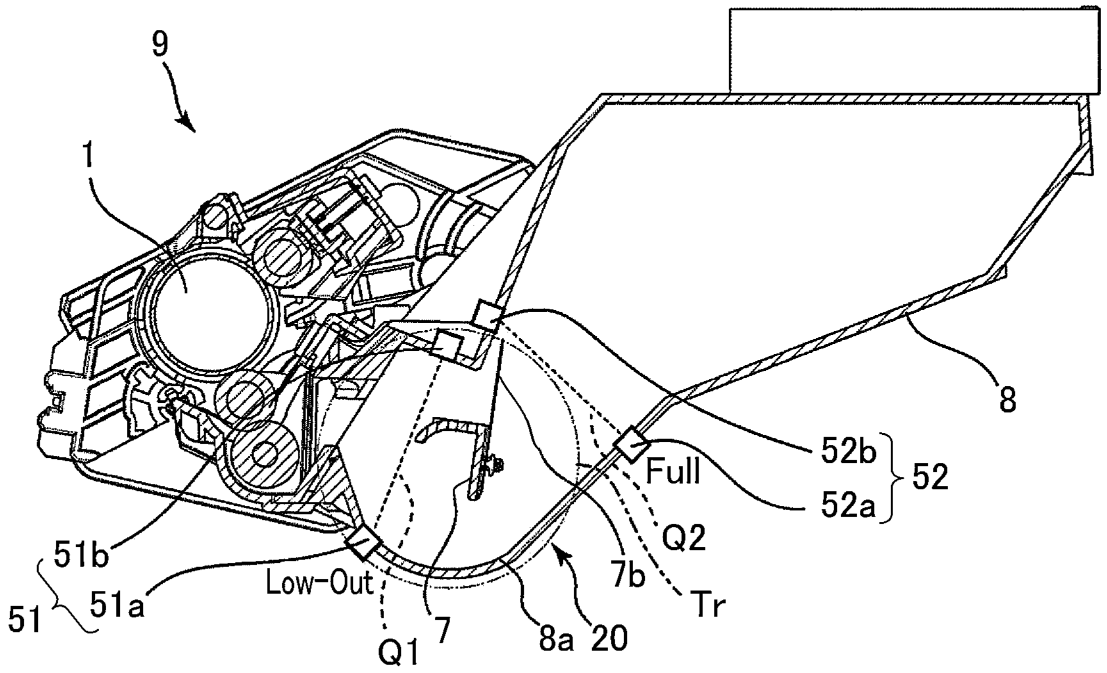

FIG. 5 is a sectional view showing a first remaining toner amount sensor and a second remaining toner amount sensor in the embodiments 1 to 3.

Figure 6:
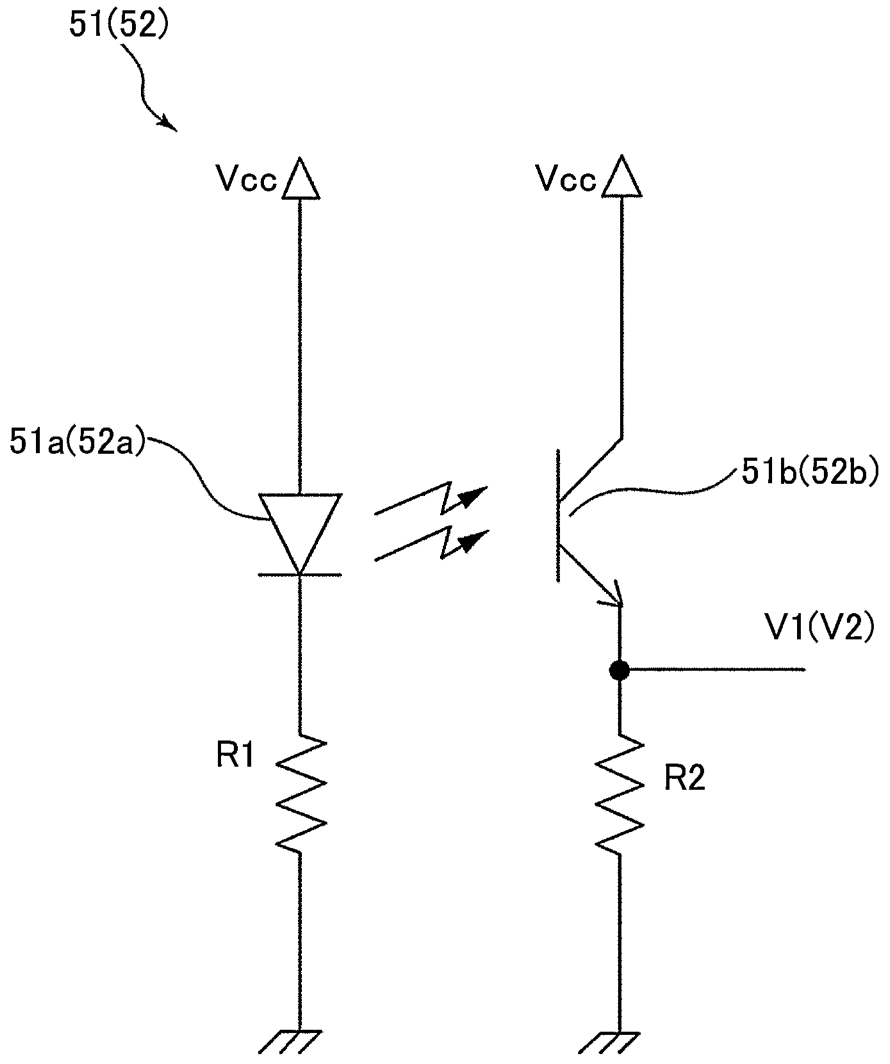

FIG. 6 is a circuit view showing the first remaining toner amount sensor and the second remaining toner amount sensor in the embodiments 1 to 3.

Figure 7:
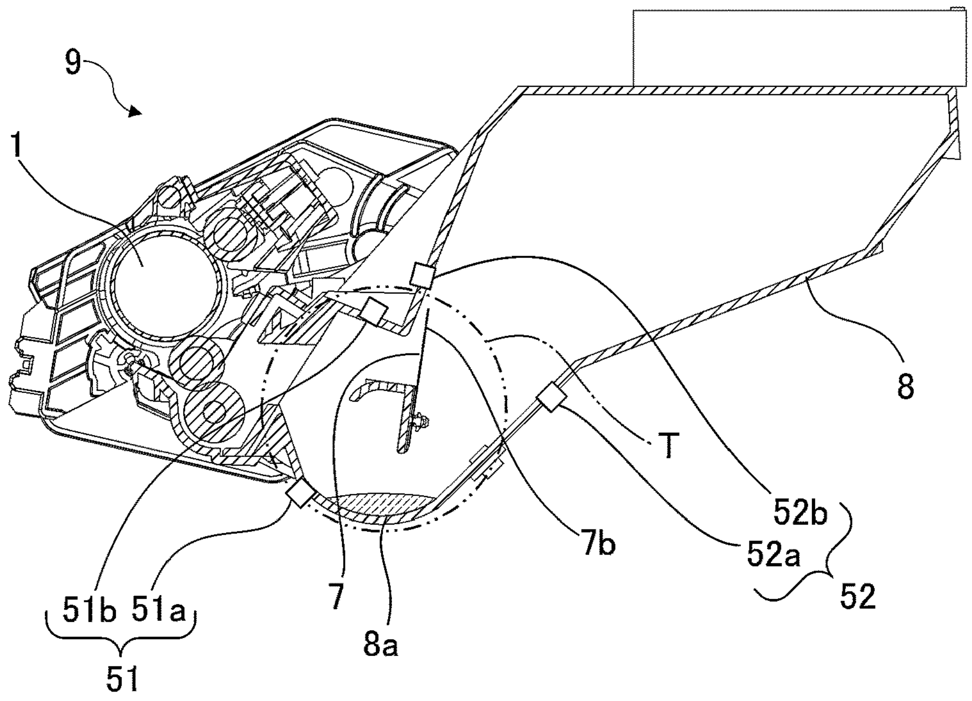
Figure 7:
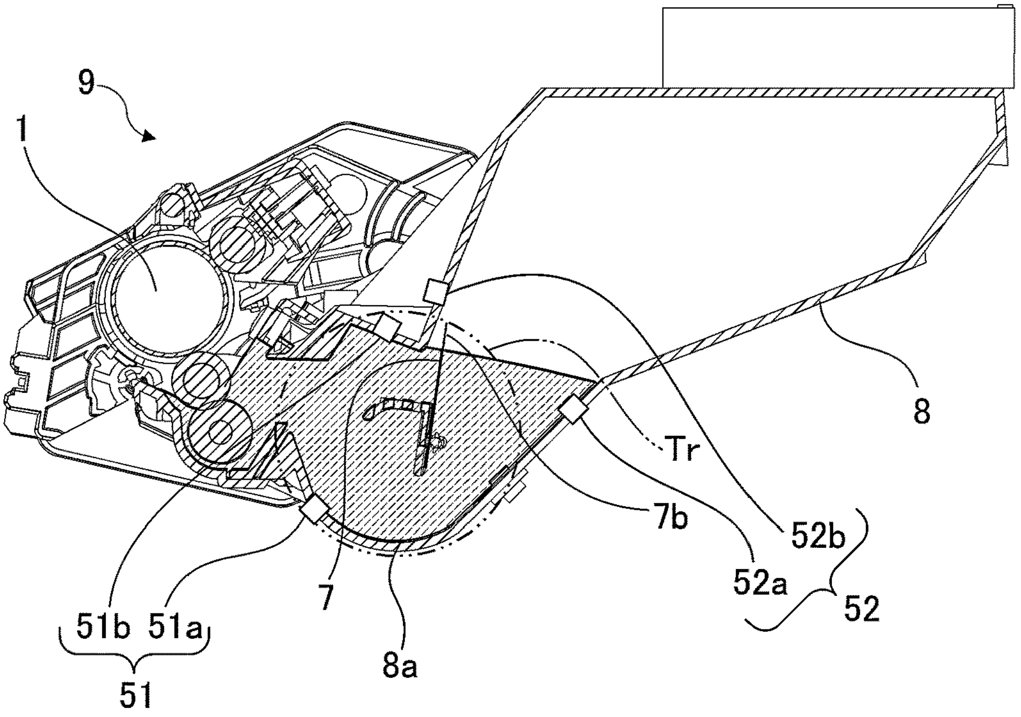

Parts (a) and (b) of FIG. 7 are sectional views.

Figure 8:
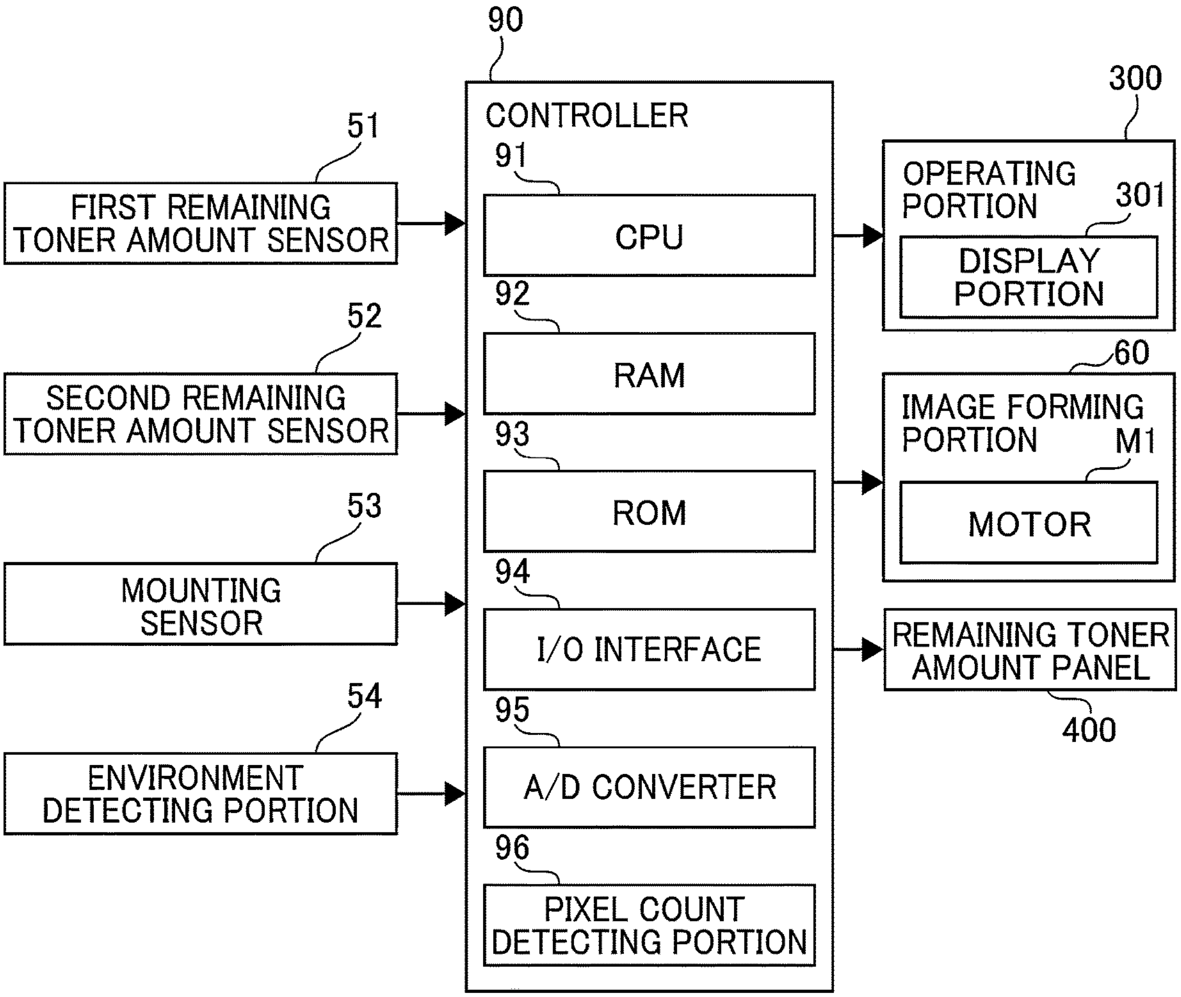

FIG. 8 is a block diagram showing a control system of the image forming apparatus in the embodiments 1 to 3.

Figure 9:
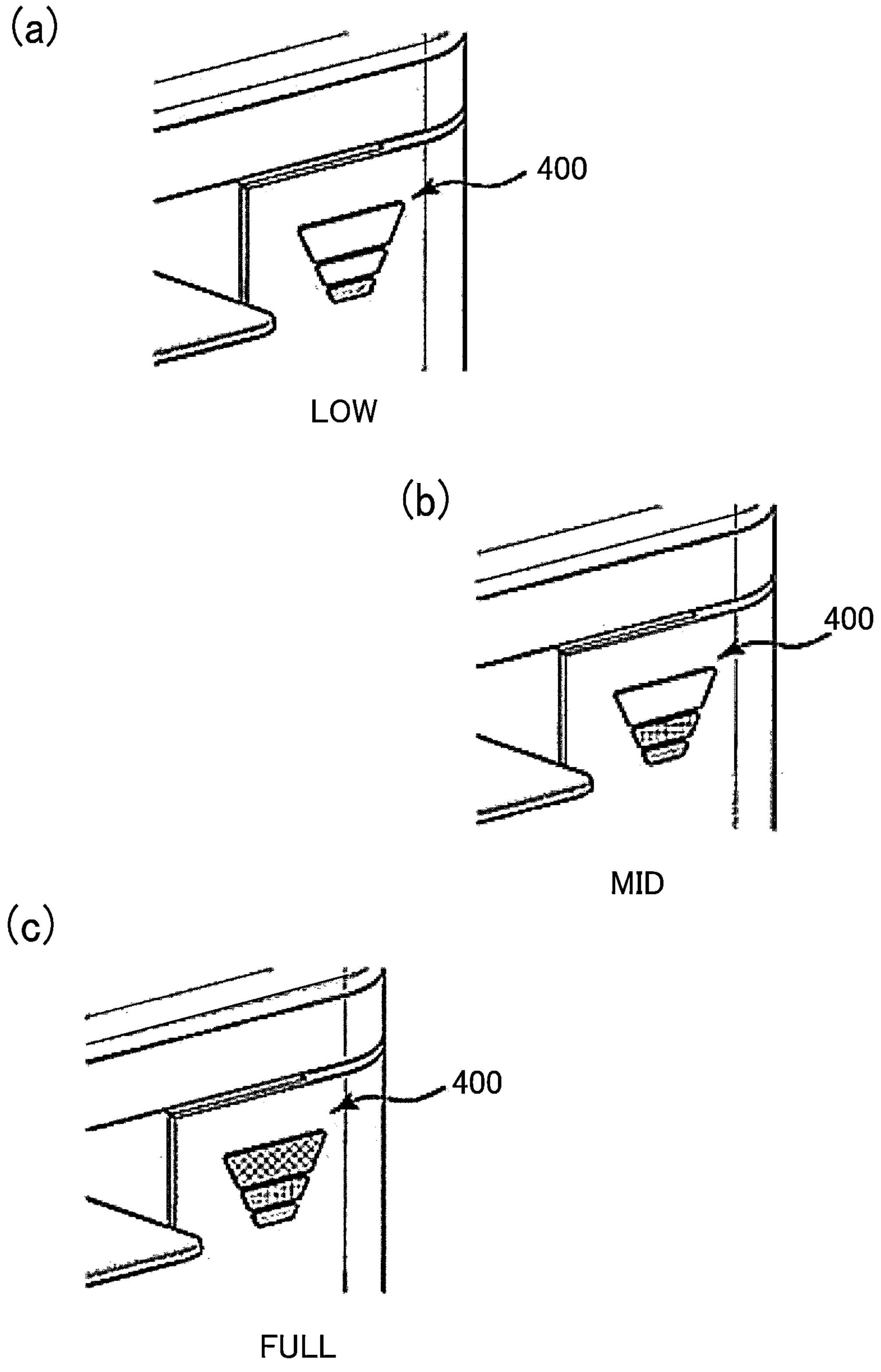

Parts (a) to (c) of FIG. 9 are perspective views showing a remaining toner amount panel in the embodiments 1 to 3 in the case where a remaining toner amount is different.

Figure 10:
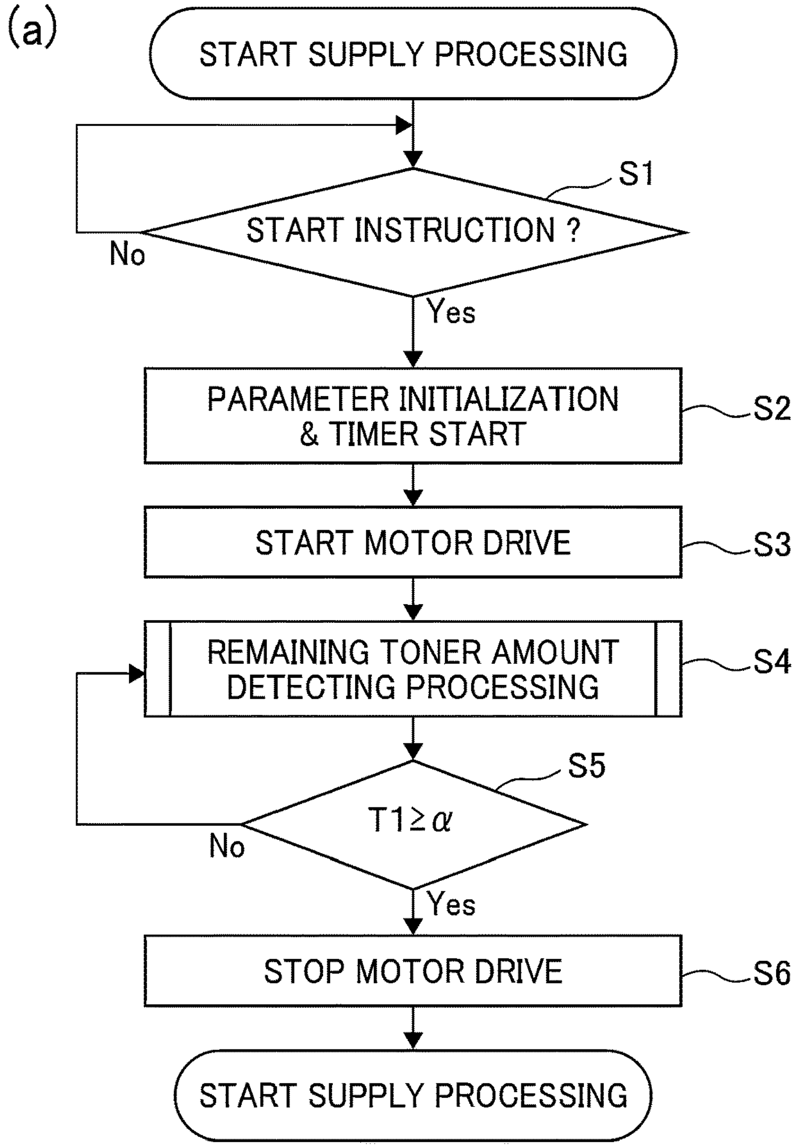
Figure 10:
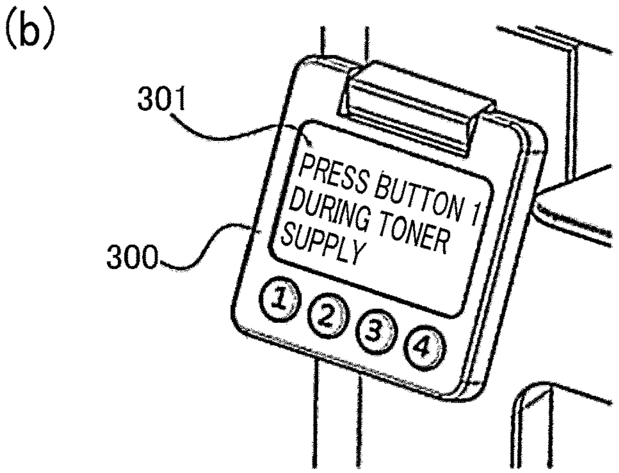

Parts (a) and (b) of FIG. 10 are a flowchart showing toner supplying processing and an operating portion, respectively, in the embodiments 1 to 3.

Figure 11:
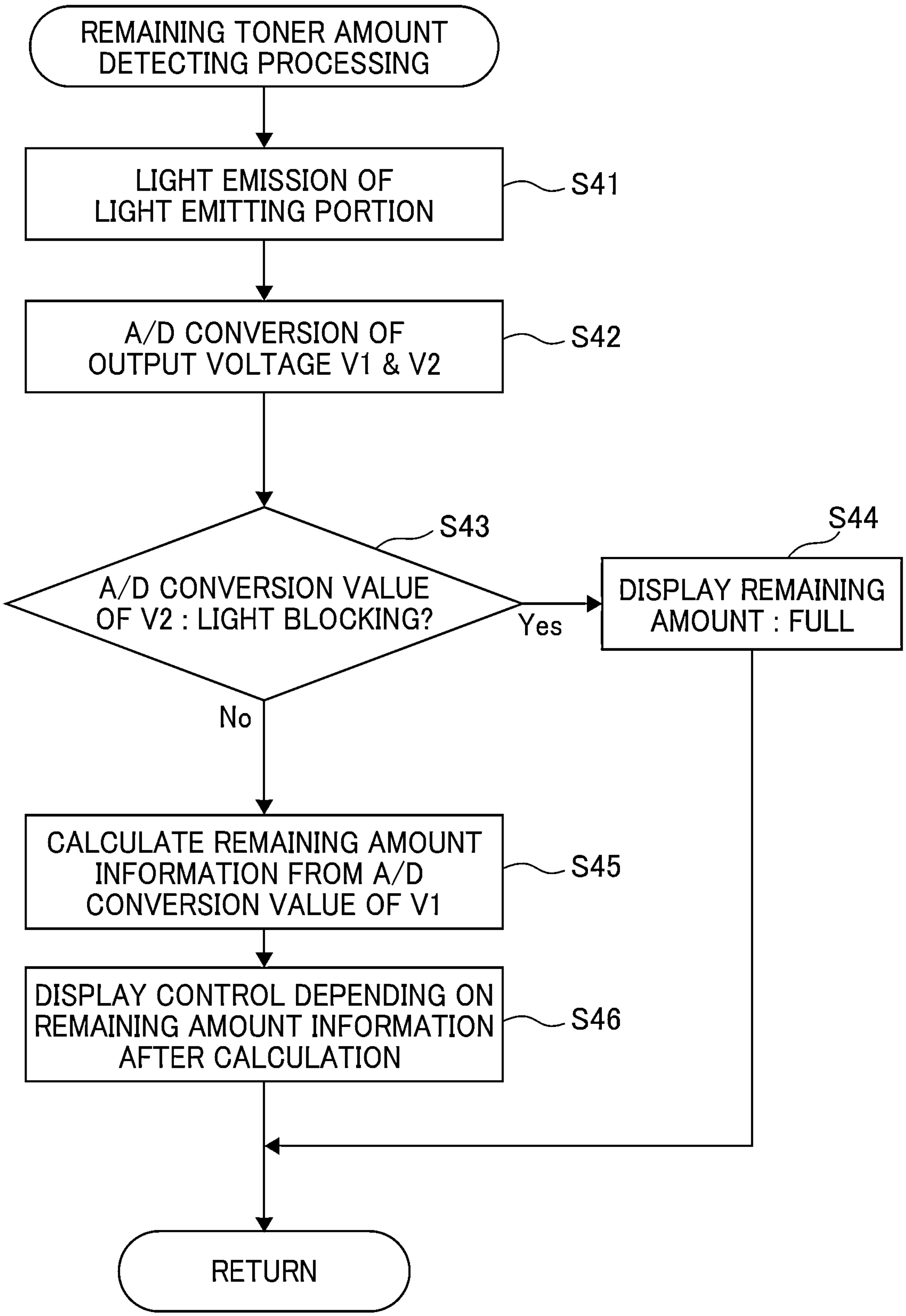

FIG. 11 is a flowchart showing remaining toner amount detecting processing in the embodiments 1 to 3.

Figure 12:
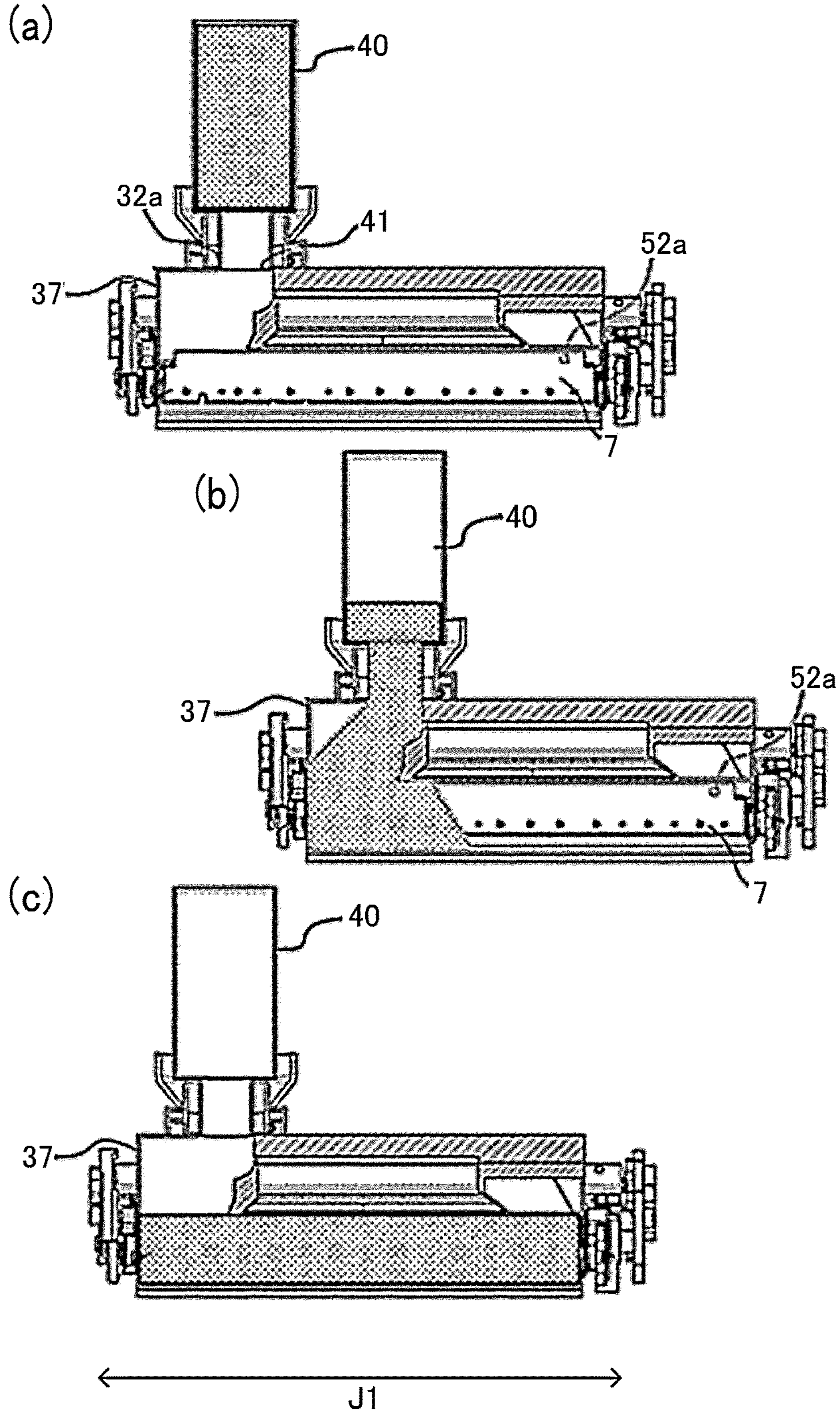

Parts (a) to (c) of FIG. 12 are sectional views each showing a state during toner supply.

Figure 13:
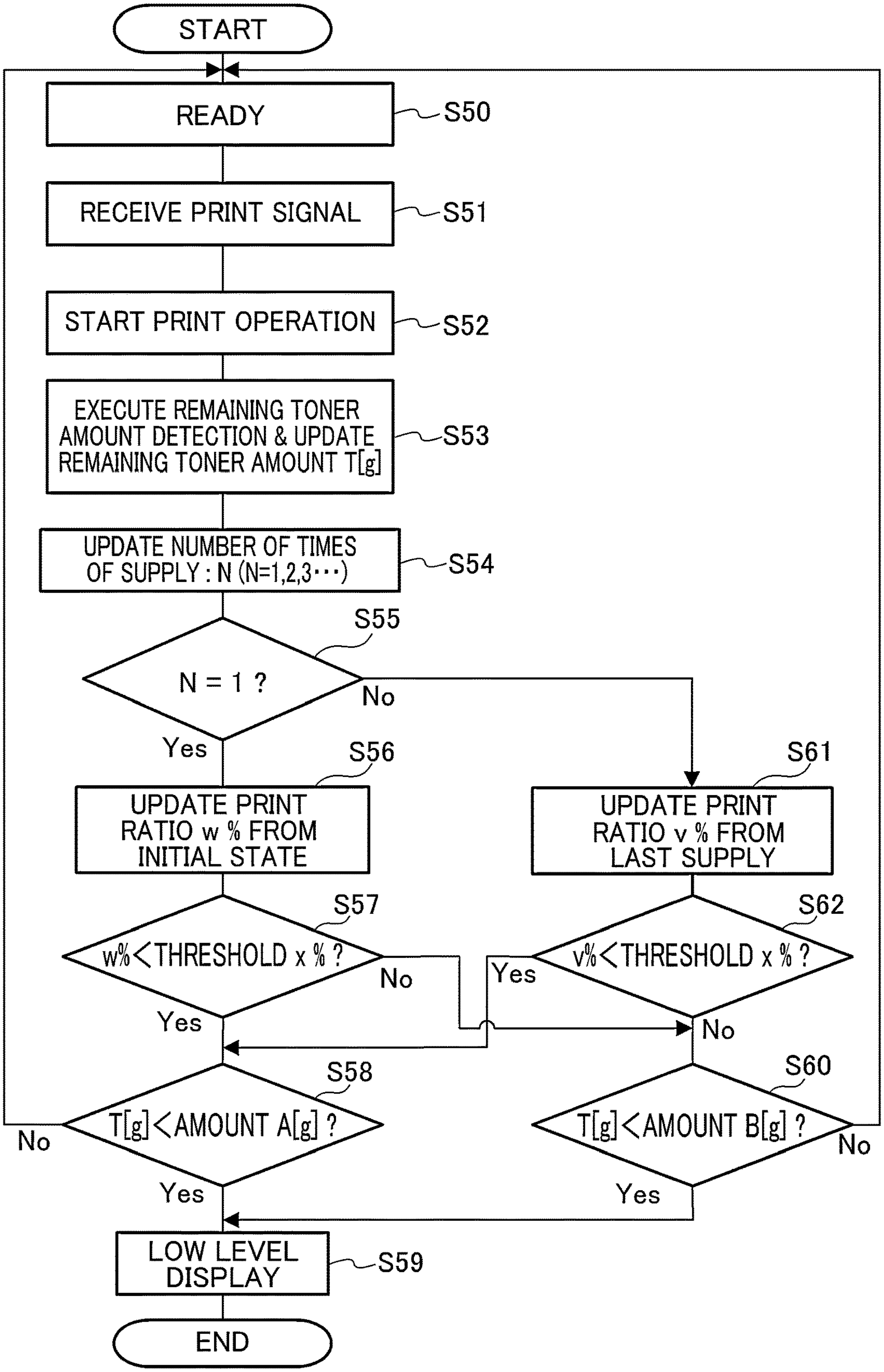

FIG. 13 is a flowchart showing remaining toner amount display processing in the embodiment 1.

Figure 14:
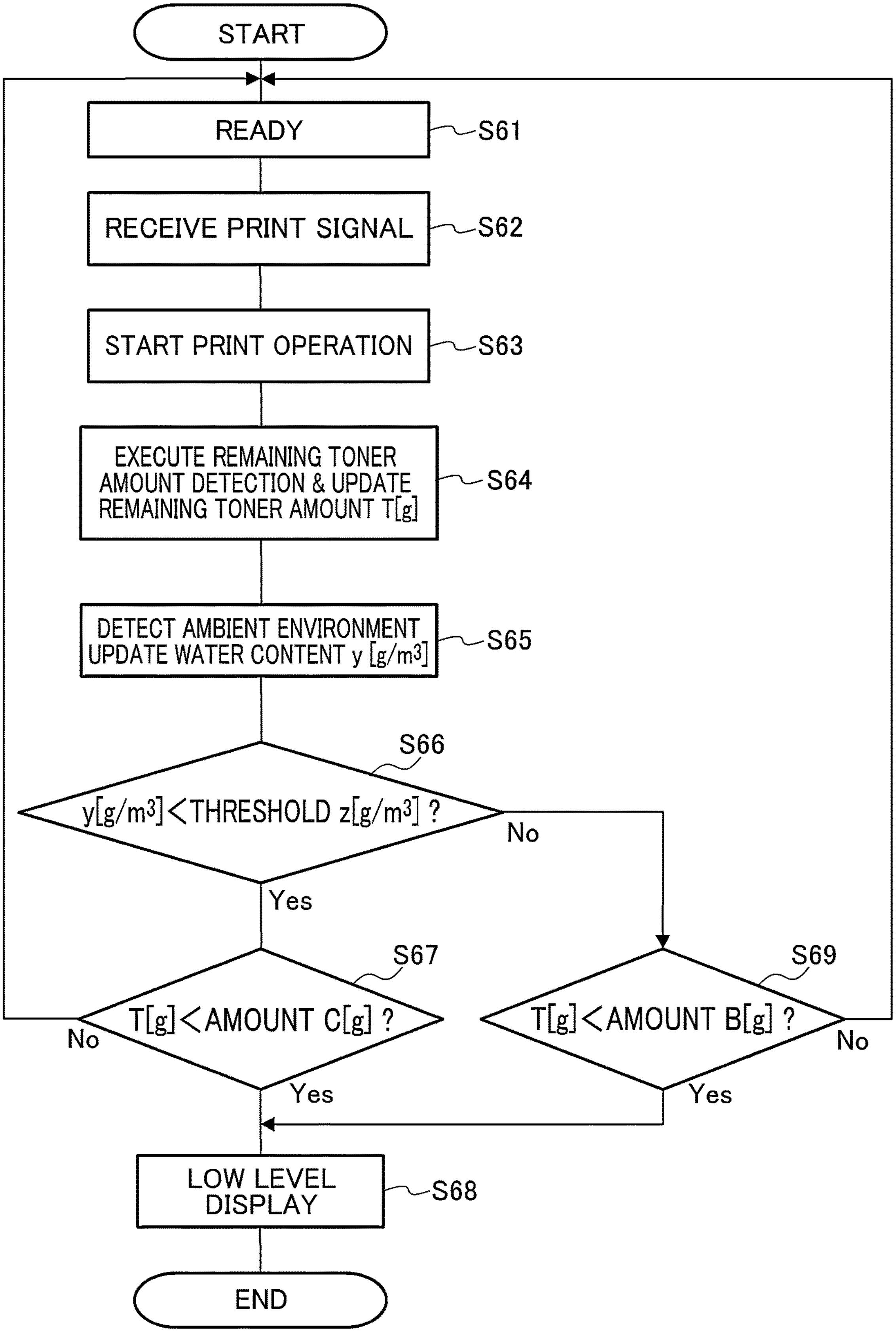

FIG. 14 is a flowchart showing remaining toner amount display developing in the embodiment 2.

Figure 15:
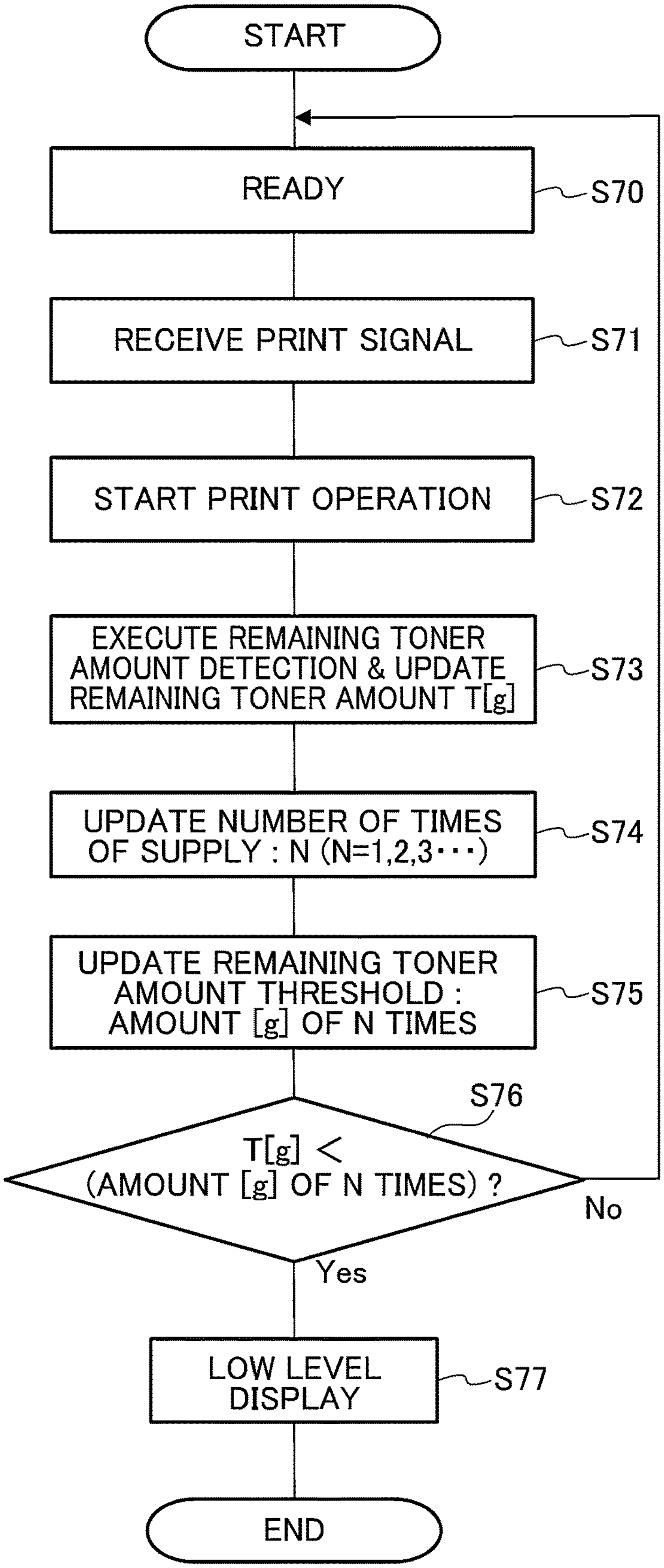

FIG. 15 is a flowchart showing remaining toner amount display processing in the embodiment 3.

DESCRIPTION OF THE EMBODIMENTS

In the following, an image forming apparatus according to the present invention will be specifically described while making reference to the drawings. However, dimensions, materials, shapes, a relative arrangement, and the like of constituent elements described in the following embodiments should be appropriately changed depending on constitutions and various conditions of apparatuses to which the present invention is applied, and, the scope of the present invention is not intended to be limited to the following embodiments.

Further, in a recording material used in the image forming apparatus, various sheet materials different in material including papers such as plain paper and thick paper, a plastic film such as a sheet for an overhead projector, special-shaped sheets such as an envelope and index paper, a cloth, and the like are included.

General Structure

Figure 1:
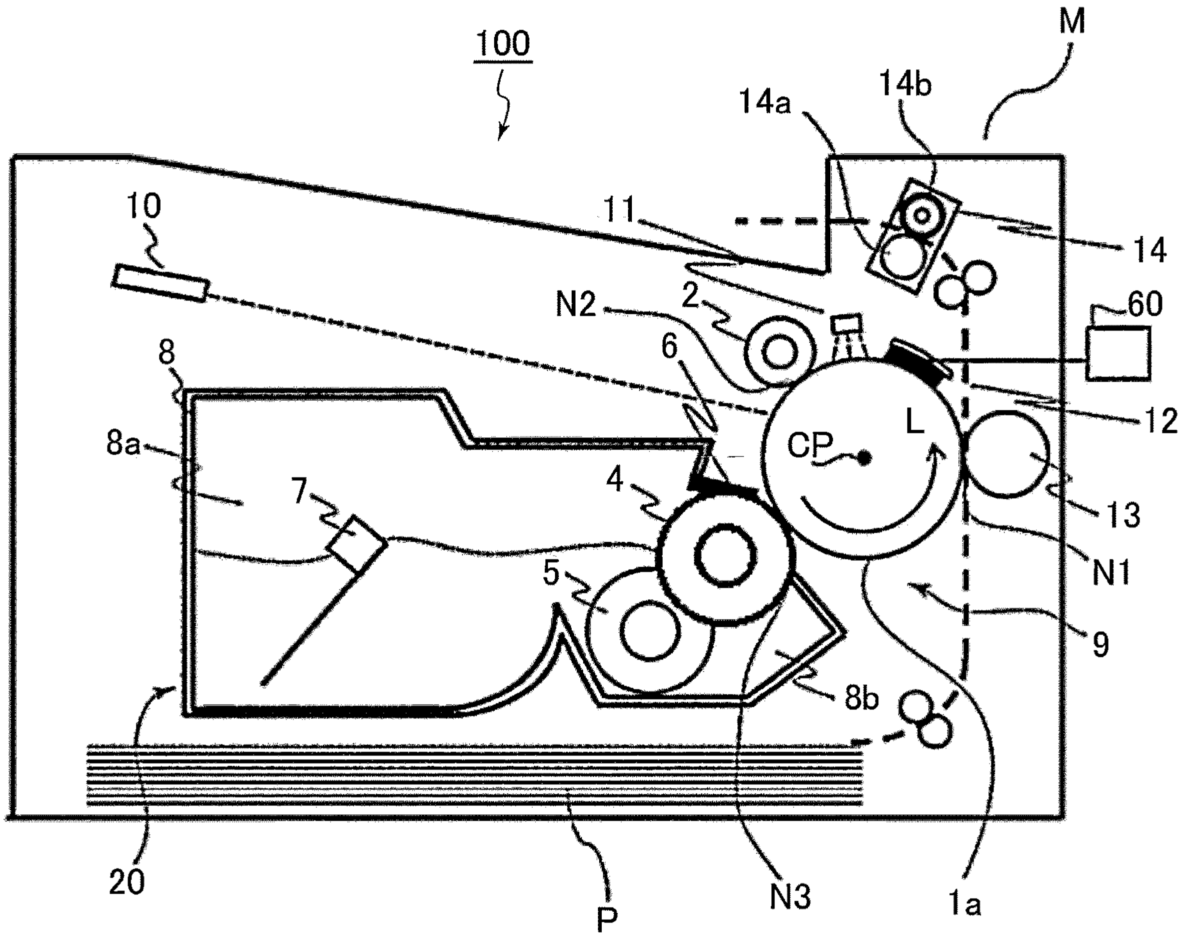
FIG. 1 is an entire schematic view showing an image forming apparatus of embodiments 1 to 3.

An image forming apparatus 100 of an embodiment 1 is a monochromatic laser beam printer of an electrophotographic type. In an apparatus main assembly M of the image forming apparatus 100, as shown in FIG. 1, a process unit 9 of a direct transfer type is mounted. The process unit 9 includes a photosensitive drum 1, and members provided at a periphery of the photosensitive drum 1, including a charging roller 2, a developing device 20, a discharging device, and a brush member 12. Further, the apparatus main assembly M includes a scanner unit 10 for forming an electrostatic latent image by irradiating the photosensitive drum 1 with laser light and a transfer roller 13 for forming a transfer nip N1 between itself and the photosensitive drum 1 and for transferring a toner image onto a recording material P in the transfer nip N1. The transfer roller 13 contacts a surface la of the photosensitive drum 1 and transfers the toner image from the photosensitive drum 1. Incidentally, in the embodiment 1, the process unit 9 is constituted detachably mountable to the apparatus main assembly M, but is not limited thereto. For example, the process unit 9 may also be constituted so as not to be detachably mountable to the apparatus main assembly M.

The photosensitive drum 1 which is an image bearing member is rotatable about a rotational axis CP extending in an axial direction J1 (see part (b) of FIG. 2) and is a photosensitive member molded in a cylindrical shape. The photosensitive drum 1 includes a photosensitive layer formed of a negatively chargeable organic photosensitive member on a substrate molded in a drum shape with aluminum. Specifically, the photosensitive drum 1 is a rigid member constituted by successively applying a resistance layer, an undercoat layer, and the photosensitive layer on an outer peripheral surface of an aluminum cylinder of 24 mm in diameter by a dip coating method, and the photosensitive layer includes a charge generating layer and a charge transporting layer. A film thickness of the charge transporting layer is 22 μm. Further, the photosensitive drum 1 is rotationally driven about the rotational axis CP in an arrow L direction at a predetermined peripheral speed. The peripheral speed of the photosensitive drum 1 defines a speed of image formation by the image forming apparatus 100, and therefore, is also called a process speed.

The charging roller 2 which is a charging member contacts the photosensitive drum 1 at a predetermined press-contact force and forms a charging portion N2. Further, to the charging roller 2, a charging voltage which is a DC voltage is applied from a charging voltage applying circuit (not shown), so that the charging roller 2 electrically charges the surface 1*a* of the photosensitive drum 1 uniformly to a predetermined potential. To the charging roller 2 in the embodiment 1, the charging voltage of −1400 V is applied so that a surface potential (pre-exposure potential VD) of the photosensitive drum 1 becomes −800 V. That is, the photosensitive drum 1 is charged by the charging roller 2 to the pre-exposure potential VD which is a fourth potential, in a direction of a negative polarity which is the same polarity as a polarity of the toner. The charging roller 2 includes a core metal of 6 mm in diameter, a base layer of a hydrin rubber, and a surface layer of urethane, and is constituted so as to have an outer diameter of 12 mm. Further, a resistance of the charging roller 2 is $1\times10^6$ Ω or less, and a hardness of the charging roller 2 is 70 degrees as measured by MD-1 rubber hardness meter. Incidentally, as the charging voltage in the embodiment 1, the DC voltage was used, but the charging voltage is not limited thereto. A voltage in the form of superposition of the DC voltage with an AC voltage may be used.

The scanner unit 10 irradiates the surface la of the photosensitive drum 1, by using a rotating polygonal mirror, with laser light corresponding to image information inputted from an external device, so that the surface 1*a* of the photosensitive drum 1 is subjected to scanning exposure. By this light exposure, an electrostatic latent image depending on the image information is formed on the surface 1*a* of the photosensitive drum 1. The scanner unit 10 is a semiconductor laser, and not only irradiates the photosensitive drum surface with the laser light from a laser of 800 nm in a wavelength, but also is capable of changing a light amount of the laser light. Incidentally, the scanner unit 10 is not limited to a laser scanner device, but for example, an LED exposure device including an LED array in which a plurality of LEDs are arranged along a longitudinal direction of the photosensitive drum 1.

The developing device 20 includes a developing container 8 which is a frame for the developing device 20, a developing roller 4, and a supplying roller 5 for supplying the developer to the developing roller 4. Inside the developing container 8 which is an accommodating portion, an accommodating chamber 8*a* for accommodating toner (developer) and a developing chamber 8*b* including the developing roller 4 are formed. The developing roller 4 and the supplying roller 5 are rotatably supported by the developing container 8. Further, the developing roller 4 is disposed at an opening of the developing container 8 so as to oppose the photosensitive drum 1. The supplying roller 5 rotatably contacts the developing roller 4, and the toner as the developer accommodated in the developing container 8 is applied onto the surface of the developing roller 4 by the supplying roller 5.

The developing device 20 uses a contact development type as a development type. That is, a toner layer carried on the developing roller 4 contacts the photosensitive drum 1 at a developing portion N3 where the photosensitive drum 1 and the developing roller 4 oppose each other. In other words, the developing roller 4 which is a rotatable developing member forms the developing portion N2 between itself and the photosensitive drum 1. To the developing roller 4, a developing voltage which is a DC voltage is applied from a developing voltage applying portion (not shown). Under application of the developing voltage, the toner carried on the developing roller 4 is transferred from the developing roller 4 onto the surface 1*a* of the photosensitive drum 1 in accordance with a potential distribution of the surface 1*a* of the photosensitive drum 1, so that the electrostatic latent image is developed into a toner image. Incidentally, in the embodiment 1, a reversal development type is employed. That is, the toner image is formed by deposition of the toner on a region of the surface 1*a* of the photosensitive drum 1 attenuated in charge amount by being exposed to light in an exposure step after being charged in a charging step.

Further, in the embodiment 1, the toner which is 6 μm in particle size and of which normal charge polarity is a negative polarity is used. As the toner in the embodiment 1, a polymerization toner formed by a polymerization method as an example is employed. Further, the toner in the embodiment 1 is a so-called non-magnetic one-component developer which does not contain a magnetic component and in which the toner is carried on the developing roller 4 principally by an intermolecular force or an electrostatic force (mirror force). However, a one-component developer containing a magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used. Further, the developing device 20 may be of a non-contact developing type in which the developing device 20 is disposed with a predetermined gap between itself and the photosensitive drum 1.

The developing roller 4 is prepared by coating a core metal of 6 mm in diameter with a base layer of a silicone rubber and a surface layer of urethane rubber so as to have an outer diameter of 15 mm. Further, a resistance value of the developing roller 4 is $1\times10^4$ to $1\times10^{12}$ Ω. The supplying roller 5 is an electroconductive elastic sponge roller prepared by forming a foam member on an outer peripheral surface of a core metal of 6 mm in diameter.

Further, the supplying roller 5 is $1\times10^4$ to $1\times10^8$ Ω in resistance value and is 200 gf in hardness. The hardness of the supplying roller 5 in the embodiment 1 is a value obtained by measuring a load when a flat plate of 50 mm in longitudinal width (length in an axial direction J1) is caused to enter from the surface of the supplying roller 5 by 1 mm.

Inside the developing container 8, a stirring member 7 is provided. The stirring member 7 not only stirs the toner in the developing container 8 but also sends the toner toward the developing roller 4 and the supplying roller 5 by being driven and rotated by a driving motor. Further, the stirring member 7 has a function of circulating the toner, peeled off from the developing roller 4 without being used for the development, in the developing container 8 and of uniformizing the toner in the developing container 8.

At an opening of the developing container 8 where the developing roller 4 is disposed, a developing blade 6 for regulating an amount of the toner carried on the developing roller 4 is disposed. The toner supplied to the surface of the developing roller 4 passes through an opposing portion to the developing blade 6 with rotation of the developing roller 4, so that the toner is uniformly formed in a thin layer and is charged to the negative polarity by triboelectric charge.

The developing blade 6 is a 0.1 mm-thick SUS metal plate and is disposed in contact with the developing roller 4 so that a free end thereof is on a side downstream of the developing roller 4 with respect to a rotational direction of the developing roller 4. As the developing blade 6 used in the embodiment 1, a blade prepared by cutting and processing an end of the SUS metal plate from a contact surface side with the developing roller 4 is used. A free end portion of the developing blade 6 is bent in a cutting direction by the cutting processing.

The transfer roller 13 which is a transfer portion includes a base layer of an ion conductive sponge so as to have an outer diameter of 15 mm relative to a core metal of 6 mm in diameter. Further, the transfer roller 13 is $4\times10^7$ Ω in resistance value in an environment of a temperature of 22° C. and is 30 degrees in hardness as measured by Asker-C rubber hardness meter (manufactured by Kobunshi Keiki Co., Ltd.).

Image Forming Operation

When an instruction of image formation is outputted to the image forming apparatus 100, on the basis of image information inputted from an external computer or the like connected to the image forming apparatus 100, an image forming process is started. When the image forming process is started, the photosensitive drum 1 is driven by a driving source (not shown) and is rotated at a predetermined process speed in an arrow L direction of FIG. 1. In the embodiment 1, the process speed of the photosensitive drum 1 is 140 rpm.

In the process unit 9, the discharging device 11 for electrically discharging the photosensitive drum 1 is provided on a side downstream of the transfer nip N1 and upstream of the charging potion N2 with respect to the rotation direction (arrow L direction) of the photosensitive drum 1. Specifically, the discharging device 11 which is a discharging portion is disposed between the brush member 12 and the charging roller 2 with respect to the rotational direction of the photosensitive drum 1. The discharging device 11 discharges (removes) the surface potential of the photosensitive drum 1 before the photosensitive drum surface reaches the charging portion N2 in order to generate stable electric discharge at the charging portion N2.

Then, the charging roller 2 uniformly charges the photosensitive drum surface so that a surface potential (pre-exposure potential VD) of the rotating photosensitive drum 1 becomes −800 V. The scanner unit 10 irradiates the photosensitive drum 1 with laser light on the basis of the inputted image information. By this, the electrostatic latent image is formed on the uniformly charged surface 1*a* of the photosensitive drum 1. In the embodiment 1, the scanner unit 10 irradiates the photosensitive drum surface with the later light at a light quantity of 0.45 $J/cm^2$ so that a potential VL after exposure of the photosensitive drum 1 becomes −100 V.

At this time, on the surface of the developing roller 4, a toner layer charged to a predetermined polarity is formed. Then, the developing voltage is applied from a developing voltage applying portion (not shown) to the developing roller 4, whereby the electrostatic latent image on the photosensitive drum 1 is developed at the developing portion N3, so that the toner image is formed on the photosensitive drum 1. As the developing voltage in the embodiment 1, −400 V is applied to the developing roller 4.

In parallel to the above-described image forming process, the recording material P stored at a lower portion of the image forming apparatus 100 is fed. The recording material P is conveyed to the transfer nip N1 in synchronism with a timing when the toner image formed on the photosensitive drum 1 reaches the transfer nip N1. Further, in synchronism with this timing, to the transfer roller 13, a transfer voltage which is a DC voltage is applied from a transfer voltage applying circuit (not shown). By this, the toner image carried on the photosensitive drum 1 is transferred onto the recording material P passing through the transfer nip N1. As the transfer voltage in the embodiment 1, to the transfer roller 13, +1500 V is applied.

The recording material P on which the toner image is transferred is conveyed to the fixing device 14. The fixing device 14 is of a heat fixing type in which an image is fixed by heating and melting unfixed toner on the recording material P. The fixing device 14 includes a fixing film 14*a*, a fixing heater such as a ceramic heater for heating the fixing film 14*a*, and a pressing roller 14*b* press-contacted to the fixing film 14*a*. When the recording material P passes through a nip between the fixing film 14*a* and the pressing roller 14*b*, the toner image is heated and pressed. By this, toner particles are melted and then are stuck so that the toner image is fixed on the recording material P. The recording material P passed through the fixing device 14 is discharged to an outside of the image forming apparatus 100 by a discharging roller pair (not shown).

Further, the image forming apparatus 100 includes an environment detecting portion 54 which is an environment detecting means. The environment detecting portion 54 is disposed in the image forming apparatus 100 and detects ambient temperature and humidity. On the basis of a detection result of the environment detecting portion 54, voltages applied to the charging roller 2 and the developing roller 4 and control of the scanner unit 10, the transfer roller 13, the fixing device, and the like are corrected.

Collection of Transfer Residual Toner

The toner remaining on the photosensitive drum 1 without being transferred onto the recording material P (hereinafter, this toner is referred to as transfer residual toner) is removed in the following step. The photosensitive drum 1 after the transfer step lowers in surface potential by being influenced by the transfer voltage applied during passing through the transfer nip N1. The surface potential of the photosensitive drum 1 after the transfer step in the embodiment 1 is −150 V. After the transfer step, the photosensitive drum surface is discharged by the discharging device 11 so that a remaining surface potential on the photosensitive drum 1 becomes 0 V and is rotated toward the charging portion N2. In the transfer residual toner, toner charged to the positive polarity and toner which is charged to the negative polarity but which does not have sufficient electric charges are present in mixture. The photosensitive drum 1 after the transfer is charge-removed by the discharging device 11, and the charging roller 2 is caused to generate uniform electric discharge, so that the transfer residual toner is charged again to the negative polarity. The transfer residual toner charged again to the negative polarity at the charging portion N2 reaches the developing portion N3 with rotation of the photosensitive drum 1. Then, a surface region of the photosensitive drum 1 passed through the charging portion N2 is exposed to light by the scanner unit 10 while being in a state in which the transfer residual toner is deposited on the surface, so that the electrostatic latent image is written (formed).

Here, behavior of the transfer residual toner that reached the developing portion N3 will be described by dividing a portion of the photosensitive drum 1 into an exposure portion and a non-exposure portion. The transfer residual toner deposited on the non-exposure portion of the photosensitive drum 1 is transferred onto the developing roller 4 at the developing portion N3 by a potential difference between the pre-exposure potential VD of a non-exposure portion of the photosensitive drum 1 and the developing voltage, and is collected in the developing container 8. This is because the developing voltage applied to the developing roller 4 on the assumption that a normal charge polarity of the toner is negative is a positive polarity relative to the pre-exposure potential VD of a non-exposure portion. Incidentally, the toner collected in the developing container 8 is stirred and dispersed with the toner in the developing container 8 by the stirring member 7, and is carried on the developing roller 4, so that the toner is used again in the developing step.

On the other hand, the transfer residual toner deposited on the exposure portion of the photosensitive drum 1 remains on the surface 1*a* of the photosensitive drum 1 without being transferred from the photosensitive drum 1 onto the developing roller 4 at the developing portion N3. This is because the developing voltage applied to the developing roller 4 on the assumption that the normal charge polarity of the toner is the negative polarity becomes a further negative potential than the pre-exposure potential VD of the exposure portion. The transfer residual toner remaining on the surface 1*a* of the photosensitive drum 1 is carried on the photosensitive drum 1 together with another toner transferred from the developing roller 4 onto the exposure portion, and is moved to the transfer nip N1, so that the toner is transferred onto the recording material P at the transfer nip N1.

Thus, in the embodiment 1, the process unit 9 has a cleaner-less constitution in which the transfer residual toner is collected in the developing device 20 and is utilized again. By causing the process unit 9 to have the cleaner-less constitution, a mounting space for collecting container for collecting the transfer residual toner or the like becomes unnecessary and further downsizing of the image forming apparatus 100 becomes possible, and further, it is also possible to realize printing cost reduction by re-utilizing the transfer residual toner.

Constitution of Developing Container and Toner Pack

Next, constitutions of the developing container 8 and a toner pack 40 will be described. Part (a) of FIG. 2 is a perspective view showing the developing container 8 and the toner pack 40, and part (b) of FIG. 2 is a front view showing the developing container 32 and the toner pack 40. Part (a) of FIG. 3 is a 40A-40A sectional view of part (b) of FIG. 2, and part (b) of FIG. 3 is a 40B-40B sectional view of part (b) of FIG. 2.

As shown in part (a) of FIG. 2 to part (b) of FIG. 3, the developing container 8 includes an accommodating chamber 8*a* in which the stirring member 7 is disposed, and the accommodating chamber 8*a* which is an accommodating portion for accommodating the developer extends in a longitudinal direction (left-right direction, axial direction J1 of part (b) of FIG. 2) of the developing container 8. Further, the accommodating chamber 8*a* is not only integrally constituted with a frame which rotatably supports the developing roller 4 and the supplying roller 5 but also accommodates the developer for being carried on the developing roller 4. Further, the developing container 8 includes an inclined portion 37 being a projected portion which projects obliquely upward from one end portion of the accommodating chamber 8*a* in the longitudinal direction and which communicates with the accommodating chamber 8*a*.

At an upper end portion (top end portion) of the inclined portion 37, a mounting portion 57 where the toner pack 40 is mountable is provided, and at the mounting portion 57, a supply opening 32*a* for permitting supply of the developer from the toner pack 40 to the accommodating chamber 8*a* is formed. To the mounting portion 57, the toner pack 40 can be mounted in a state in which the toner pack 40 is exposed to an outside of the apparatus.

The developing container 8 is constituted so that the toner supplied through the supply opening 32*a* reaches the stirring member 7 only by self-weight. Here, the term "only by self-weight" means that in the case where the toner is supplied in a state in which the developing container 8 is installed (mounted) in the main assembly, a stirring member (conveying member) which is rotated or swung for supplying the toner is not provided between the supply opening 32*a* of the developing container 8 to the stirring member 7, but the developing container 8 is constituted so that the toner reaches the stirring member 7 by the self-weight thereof only. Further, in the developing container 8, the stirring member 7 is a rotatable member closest to the supply opening 32*a* and is disposed so that the toner in the accommodating chamber 8*a* reaches the developing roller 4 or the supplying roller 5 by rotation thereof.

A gripping portion 39 including a tab portion 39*a* capable of being gripped by the user who hooks the tab portion 39*a* with his (her) fingers, and the tab portion 39*a* is formed by being projected upward from a top surface of the gripping portion 39. The inclined portion 37 is formed in a hollow shape at an inner portion thereof, and on an upper surface, the supply opening 32*a* is formed. The supply opening 32*a* is constituted so as to be connectable to the toner pack 40.

The toner pack 40 is constituted so as to be mountable to and demountable from the mounting portion 57 of the inclined portion 37. Further, the toner pack 40 includes a shutter member 41 which is provided at an opening and which is openable and closable, and a plurality (three in this embodiment) of projections 42 formed corresponding to a plurality (three in this embodiment) of grooves 32*b* formed at the mounting portion 57. In the case where the user supplies the toner to the developing container 8, the user performs alignment so that the projections 42 of the toner pack 40 pass through the grooves 32*b* of the mounting portion 57, so that the user connects the toner pack 40 with the mounting portion 57. Then, when the toner pack 40 is rotated 180 degrees in this state, the shutter member 41 of the toner pack 40 is abutted against an abutting portion (not shown) of the mounting portion 57 and is rotated relative to a main body of the toner pack 40, so that the shutter member 41 is opened. By this, the toner accommodated in the toner pack 40 leaks down from the toner pack 40, and the toner which leaked down enters the hollow-shaped inclined portion 37. Incidentally, the shutter member 41 may also be provided on the supply opening 32*a* side.

The inclined portion 37 includes an inclined surface 37*a* at a position opposing the opening of the supply opening 32*a*, and the inclined surface 37*a* is inclined downward toward the accommodating chamber 8. For this reason, the toner supplied through the supply opening 32*a* is guided to the accommodating chamber 8 by the inclined surface 37*a*. As shown in FIG. 3, the stirring member 7 includes a stirring shaft 7*a* extending in the longitudinal direction and a blade portion 7*b* fixed to the stirring shaft 7*a* and extending toward an outside in a radial direction than the stirring shaft 7*a*. The blade portion 7*b* is a flexible sheet. The stirring member 7 rotates about the stirring shaft 7*a*.

The toner supplied through the supply opening 32*a* disposed on an upstream side in a (recording material) conveying direction of the stirring member 7 is sent toward the developing roller 4 and the supplying roller 5 with rotation of the stirring member 7. The conveying direction of the stirring member 7 is a direction parallel to the longitudinal direction of the developing container 8. The supply opening 32*a* and the inclined portion 37 are disposed at one end portion of the developing container 8 in the longitudinal direction, but the toner is spread over a full length of the developing container 8 by repeating the rotation of the stirring member 7. Incidentally, in the embodiment 1, the stirring member 7 is constituted by the stirring shaft 7*a* and the blade portion 7*b*, but as a constitution for spreading the toner over the full length of the developing container 8, a helical-shaped stirring shaft may also be used.

In the embodiment 1, the toner pack 40 is constituted by an easily deformable bag member made of plastic as shown in parts (a) and (b) of FIG. 4, but the present invention is not limited thereto. For example, the toner pack 40 may be constituted by a substantially conical-shaped bottle container 40B as shown in part (c) of FIG. 4, and may be constituted by a paper container 40C made of paper as shown in part (d) of FIG. 4. In either case, the toner pack may be any one in material and shape. Further, as regards a method of ejecting the toner from the toner pack, a method such that the user squeezes the toner pack with fingers if the toner pack is the toner pack 40 or the paper container 40C is suitable, and a method such that the user leaks down the toner by tapping the container or the like while vibrating the container if the toner pack is the bottle container 40B is suitable. Further, in order to discharge the toner from the bottle container 40B, a discharging mechanism may be provided in the bottle container 40B. Further, the discharging mechanism may be a constitution for receiving a driving force from the apparatus main assembly M by engaging with the apparatus main assembly M.

Further, in either toner pack, the shutter member 41 may be omitted, or a shutter member of a slide type may be applied instead of the shutter member 41. Further, the shutter member 41 may be a constitution in which the shutter member 41 is broken by mounting the toner pack on the supply opening 32*a* or by rotating the toner pack in a mounted state, or may be a demountable cap structure such as a seal.

Detecting Method of Remaining Toner Amount

Next, a method of detecting the remaining toner amount of the developing container 8 will be described using FIG. 5 to FIG. 7. In the developing device 30 in the embodiment 1, a first remaining toner amount sensor 51 and a second remaining toner amount sensor 52 which are detecting means for detecting a state depending on the remaining toner amount in the developing container 8 are provided.

The first remaining toner amount sensor 51 includes a light-emitting portion 51*a* and a light-receiving portion 51*b*, and the second remaining toner amount sensor 52 includes the light-emitting portion 52*a* and a light-receiving portion 52*b*. FIG. 6 is a circuit diagram showing an example of circuit structures of the first remaining toner amount sensor 51 and the second remaining toner amount sensor 52. Incidentally, in the following description, the circuit structure of the first remaining toner amount sensor 51 is described, and description of the circuit structure of the second remaining toner amount sensor 52 will be omitted.

In FIG. 6, an LED is used as the light-emitting portion 51*a*, and as the light-receiving portion 51*b*, a phototransistor put in an ON state by light from the light-emitting portion 51*a* is used, but the present invention is not limited thereto. For example, a halogen lamp or a fluorescent lamp may be used as the light-emitting portion 51*a*, and a photodiode or an avalanche photodiode may be used as the light-receiving portion 51*b*. Incidentally, between the light-emitting portion 51*a* and a power source voltage (voltage source) Vcc, a switch (not shown) is provided, and by putting the switch in an ON state, a voltage from the power source voltage Vcc is applied to the light-emitting portion 51*a*, so that the light-emitting portion 51*a* is in a conduction state. On the other hand, the light-receiving portion 51*b* is also provided with a switch (not shown) between itself and a power source voltage (voltage source) Vcc, and by putting the switch in an ON state, the light-receiving portion 51*b* is in a conduction state by a current depending on a light quantity detected.

To the light-emitting portion 51*a*, the power source voltage Vcc and a current-limiting resistor R1 are connected, and the light-emitting portion 51*a* emits light by a current determined by the current-limiting resistor R1. The light emitted from the light-emitting portion 51*a* passes through an optical path Q1 and is received by the light-receiving portion 51*b* as shown in FIG. 5. To a collector terminal of the light-receiving portion 51*b*, the power source voltage Vcc is connected, and to an emitter terminal, a detection resistor R2 is connected. The light-receiving portion 51*b* which is the phototransistor receives the light emitted from the light-emitting portion 51*a* and outputs a signal (current) depending on a quantity of the received light. This signal is converted into a voltage V1 by the detection resistor R2 and is inputted to an A/D converting portion 95 of a controller 90 (see FIG. 8). Incidentally, the light-receiving portion 52*b* of the second remaining toner amount sensor 52 receives light which is emitted from the light-emitting portion 52*a* and which passes through an optical path Q2, and a voltage V2 is outputted depending on a quantity of the received light and is inputted to the A/D converting portion 95 of the controller 90.

The controller 90 (CPU 91) discriminates, on the basis of an inputted voltage level, whether or not the light-receiving portions 51*b* and 52*b* receive the light from the light-emitting portions 51*a* and 51*b*. The controller 90 calculates a toner amount in the developing container 8 on the basis of a length of a time in which each light is detected by the light-receiving portion 51*b* or 52*b* and received light intensity when the toner in the developing container 8 is stirred for a certain time by the stirring member 7. That is, a ROM 93 stores, in advance, a table capable of outputting a remaining toner amount from a light receiving time and the light intensity when the toner is fed by the stirring member 7, and the controller 90 predicts/calculates the remaining toner amount on the basis of an input to the A/D converting portion 95 and the table.

More specifically, the optical path Q1 of the first remaining toner amount sensor 51 is set so as to cross a rotation locus Tr of the stirring member 7. Further, a time in which the optical path Q1 is light-blocked by the toner raised by the stirring member 7 when the stirring member 7 rotates once, i.e., a time in which the light-receiving portion 51*b* does not detect the light from the light-emitting portion 51*a*, changes depending on the remaining toner amount. Further, the received light intensity at the light-receiving portion 51*b* also changes depending on the remaining toner amount.

That is, the optical path Q1 is liable to be blocked by the toner when the remaining toner amount is large, and therefore, a time in which the light-receiving portion 51*b* receives the light becomes short, and the received light intensity of the light received by the light-receiving portion 51*b* becomes small. On the other hand, the time in which the light-receiving portion 51*b* receives the light contrarily becomes long when the remaining toner amount is small, and the received light intensity of the light received by the light-receiving portion 51*b* becomes strong. Accordingly, the controller 90 is capable of discriminating whether or not thus on the basis of the light receiving time and the received light intensity of the light-receiving portion 51*b*, the remaining toner amount is at a LOW level or at a MID level as described later. For example, as shown in part (a) of FIG. 7, in the case where the toner in the accommodating chamber 8*a* of the developing container 8 is in a slight amount, the remaining toner amount is discriminated as the LOW level. Incidentally, a state in which the remaining toner amount is at the LOW level refers to, for example, a state in which a remaining toner amount capable of permitting further printing of several tens of sheets to several hundreds of sheets remains in a predetermined print ratio (for example, pint ratio: 5%). Here, the print ratio is a numeral showing a percentage indicating that how many pixels of pixels corresponding to an image formable region on a sheet surface correspond to pixels on which the toner is deposited. The pixel referred to herein is a voltage element constituting the electrostatic latent image formed on the photosensitive drum 1 by laser irradiation (light irradiation). Specifically, in an image forming region (Left size) on the recording material P, the case where a whole surface solid black member is formed is a print ratio of 100%, and the case where no toner image is formed on the recording material P is a print ratio of 0%. In the above-described explanation, the second remaining toner amount sensor 52 is disposed so as not to cross the rotation locus Tr of the stirring member 7, but similarly as the above-described first remaining toner amount sensor 51, the second remaining toner amount sensor 52 may also be disposed so as to cross the rotation locus Tr of the stirring member 7.

Further, the optical path Q2 of the second remaining toner amount sensor 52 is set above the rotation locus Tr so as not to cross the rotation locus T of the stirring member 7. Further, the light-receiving portion 52*b* of the second remaining toner amount sensor 52 does not detect the light from the light-emitting portion 52*a* in the case where the optical path Q2 is light-blocked by the toner and detects the light from the light-emitting portion 52*a* in the case where the optical path Q2 is not light-blocked by the toner. Accordingly, irrespective of a rotation operation of the stirring member 7, on the basis of whether or not the light-receiving portion 52*b* receives the light, the controller 90 discriminates whether or not the remaining toner amount is at the FULL level as described later. For example, as shown in part (b) of FIG. 7, the toner in the accommodating chamber 8*a* of the developing container 8 is in a large amount, the remaining toner amount is discriminated as the FULL level. Incidentally, in the above-described explanation, the second remaining toner amount sensor 52 is disposed so as not to cross the rotation locus Tr of the stirring member 7, but similarly as the above-described first remaining toner amount sensor 51, the second remaining toner amount sensor 52 may also be disposed so as to cross the rotation locus Tr of the stirring member 7.

Incidentally, a detecting/estimating method of the remaining toner amount is not limited to a method (type) of an optical remaining toner amount detection described in FIG. 5, but remaining toner amount detecting/estimating methods of various well-known types can be employed. For example, two or more metal plates or electroconductive resin sheets which extend in the developing roller longitudinal direction are disposed on an inner wall of the developing container 8 which is a frame, and electrostatic capacity between the two metal plates or electroconductive resin sheets is measured, and the remaining toner amount may be detected/estimated. Or, a load cell is provided in a form such that the load cell supports the developing device 30 from below, and the CPU 91 subtracts a weight of the developing device 30 in the case where the toner is used up, from a weight measured by the load cell, so that the remaining toner amount may be calculated. Further, the first remaining toner amount sensor 51 is omitted, and from a detection result of the second remaining toner amount sensor 52 and a light emission status of the laser light, the controller 90 (CPU 91) may calculate the remaining toner amount.

Detecting Method of Print Ratio

In the embodiment 1, as a detecting method of the print ratio, a pixel count detecting portion 96 which is a measuring means each capable of counting the number of pixels to which the scanner unit 10 emits light is used. The pixel count detecting portion 96 may be constituted by the controller 90 as shown in FIG. 8, but may also be provided separately from the controller 90. Pixel count refers to count of individual image signals forming image dots for an image formed. The controller 90 also functions as an acquiring means for acquiring the print ratio. The controller 90 estimates a toner amount required for a certain image obtained by development, as a toner consumption amount x of the toner used per (one) sheet by printing, from the number of pixels to which the scanner unit 10 emits light.

Incidentally, in the embodiment 1, as the print ratio detecting means, a print ratio detecting system by the pixel count was used, but the present invention is not limited thereto. For example, the print ratio may also be detected from a detection result of a weight of the developing container during the last toner supply timing, a detection result of a weight of a present developing container, and a number of sheets subjected to the image formation in a period therebetween.

Control System of Image Forming Apparatus

FIG. 8 is a block diagram showing a control system of the image forming apparatus 100. The controller 90 as a control means of the image forming apparatus 100 includes the CPU 91 as a calculating device, a RAM 92 used as an operation area of the CPU 91, and the ROM 93 for storing various programs. Further, the controller 90 includes an I/O interface 94 as an input/output port through which the controller 90 is connected to an external device, and an A/D converting portion 95 for converting an analog signal into a digital signal.

To an input side of the controller 90, the first remaining toner amount sensor 51, the second remaining toner amount sensor 52, a mounting sensor 53, and environment detecting portion 54 are connected. The mounting sensor 53 detects that the toner pack 40 is mounted on the supply opening 32*a*. For example, the mounting sensor 53 is provided at the supply opening 32*a* and is constituted by a pressure-sensitive switch for outputting a detection signal by being pressed by the projections 42 of the toner pack 40.

Further, to the controller 90, the operating portion 300, the image forming portion 60, and a remaining toner amount panel 400 which is a notifying means capable of notifying information on the remaining toner amount are connected. The operating portion 300 includes a display portion 301 capable of displaying various setting screens, and includes physical keys and the like. The display portion 301 is constituted by a liquid crystal panel, for example. The image forming portion 60 includes a motor M1 which is a driving source for driving the photosensitive drum 1, the developing roller 4, the supplying roller 5, the stirring member 7, and the like. Incidentally, a constitution in which the photosensitive drum 1, the developing roller 4, the supplying roller 5, and the stirring member 7 are driven by separate motors may also be employed.

Remaining Toner Amount Panel

The remaining toner amount panel 400 is provided on a right side of a front surface of a casing of the apparatus main assembly M, i.e., on a side opposite from the operating portion 300 disposed on a left side, and displays information on the remaining toner amount in the developing container 8 as shown in FIG. 9. In the embodiment 1, the remaining toner amount panel 400 is a panel member consisting of a plurality (three in this embodiment) of scales arranged vertically in parallel, and the respective scales correspond to the LOW level, the MID level, and the FULL level, which are described above.

That is, as shown in part (a) of FIG. 9, in the case where only a lower scale is lighted, the remaining toner amount of the developing container 8 indicates the LOW level which is a third state. As shown in part (b) of FIG. 9, in the case where lower and central scales are lighted and an upper scale is turned off, the remaining toner amount of the developing container 8 indicates the MID level which is a second state. As shown in part (c) of FIG. 9, all the three scales are lighted, the remaining toner amount of the developing container 8 indicates the FULL level which is a first state.

Display (notification) shown in part (a) of FIG. 9 corresponds to display (LOW level display or toner empty (used-up) display) in the case where the remaining toner amount is smallest among displayable display forms (notification forms) of the remaining toner amount panel 400. By this display shown in part (a) of FIG. 9, it is possible to notify the user of that the toner supply is needed, and thus it is possible to suppress white dropout of the image due to depletion of the toner.

Incidentally, in the following description, the controller 90 discriminates a timing of execution of the supplying operation on the basis of that the remaining toner amount detected by the first remaining toner amount sensor 51 and the second remaining toner amount sensor 52 is below a discrimination threshold, but the present invention is not limited thereto. For example, the optical sensor may also be not used for detecting the remaining toner amount, and the supplying operation timing may be discriminated on the basis of that a parameter for discriminating that the remaining toner amount is small is above a discrimination threshold.

Toner Supply Processing

Next, a toner supply processing (supplying operation) for supplying the toner in the toner pack 40 to the developing container 9 will be described. As shown in FIG. 10, when the toner supply processing is started, the controller 90 executes processing of a step (hereinafter, referred to as "S") 1 and later. In S1, the controller 90 discriminates whether or not a supplying operation start instruction is provided. In the embodiment 1, the supplying operation start instruction is an operation of the user through the operating portion 300 as shown in part (b) of FIG. 10. Specifically, the user operates the operating portion 300 and performs a pushing operation of a button 1 in a state in which a message of prompting the user to perform the operation of the button 1 is displayed at the display portion 301, so that the supplying operation start instruction is outputted. Incidentally, the supplying operation start instruction is not limited to the pressing operation of the button 1, but the supplying operation start instruction may also be outputted by a touch operation in the display portion 301 or in response to detection of mounting of the toner pack 40 on the supply opening 32*a* by the mounting sensor 53. Further, a sensor for detecting opening of the shutter member 41 of the toner pack 40 is provided, and the supplying operation start instruction may be outputted on the basis of a detection result of this sensor. Further, the supplying operation start instruction may also be outputted by an operation in the external device such as a personal computer.

In S1, in the case where the controller 90 discriminated that the supplying operation start instruction is not provided, the controller 90 causes the processing to return to S1, and in the case where the controller 90 discriminated that the supplying operation start instruction is provided, the controller 90 causes the processing to go to S2. In S2, the controller 90 initializes a parameter of a timer T1 described later to an initial value (for example, zero) and causes the timer T1 to start. In S3, the controller 90 causes the motor M1 to drive, so that the stirring member 7 is rotated.

In S4, the controller 90 executes the remaining toner amount detecting processing. FIG. 11 is a flowchart for illustrating the remaining toner amount detecting processing of S4 in part (c) of FIG. 10. In S41, the controller 90 causes the light-emitting portions 51*a* and 52*a* of the first remaining toner amount sensor 51 and the second remaining toner amount sensor 52 to emit light. In S42, the controller 90 causes the A/D converting portion 95 to convert the voltages V1 and V2, outputted by the light-emitting portions 51*a* and 52*a* of the first remaining toner amount sensor 51 and the second remaining toner amount sensor 52, respectively, into digital signals (hereinafter, referred to as A/D converted values).

IN S43, the controller 90 discriminates whether or not the A/D converted value of the voltage V2 indicates light-blocking of the optical path Q2. Here, the controller 90 discriminates whether or not the optical path Q2 is light-blocked, by discriminating whether or not the A/D converted value exceeds a threshold. In S43, in the case where the controller 90 discriminated that the value indicates that the optical path Q2 is light-blocked, the controller 90 causes the processing to S44. In S44, the controller 90 causes the remaining toner amount panel 400 to display that the remaining toner amount is at the FULL level and causes the processing to return to the processing of part (a) of FIG. 10. That is, as shown in part (c) of FIG. 9, all the three scales of the remaining toner amount panel 400 are lighted.

In S43, in the case where the controller 90 discriminated that the A/D converted value of the voltage V2 does not indicate that the optical path Q2 is light-blocked, the controller 90 causes the processing to go to S45. In S45, the controller 90 calculates remaining amount information on the toner in the developing container 8 on the basis of the A/D converted value of the voltage V1. In S46, depending on the remaining amount information on the toner calculated in S45, the controller 90 causes the remaining toner amount panel 400 to display that the remaining toner amount is at the LOW level or at the MID level and causes the processing to return to the processing of part (a) of FIG. 10. That is, the first remaining toner amount sensor 51 and the second remaining toner amount sensor 52 output the remaining amount information depending on a developer amount of the developer accommodated in the developing container 8 during the operation of the stirring member 7.

Here, an example of the remaining toner amount detection will be described. For example, a time from a start of an end of drive of the motor M1 (threshold $\alpha$ described later) is set to 30 sec. During this 30 sec, the supplied toner is flattened in the longitudinal direction in the developing container 8. The remaining toner amount detection is made by averaging detection results of the first remaining toner amount sensor 51 and the second remaining toner amount sensor 52 obtained during 5 rotations when a time required for one full turn of the stirring member 7 by the motor M is, for example, 1.24 sec. That is, during this period, 1.24 sec (one full turn)×5 rotations=6.2 sec is required. Incidentally, over during the above-described 30 sec, the remaining toner amount may be detected continuously or at a timing when the toner is flattened. For example, the controller 90 may cause the remaining toner amount panel 400 to display on the basis of a detection result obtained by last 5 rotations in the above-described 30 sec. In this case, more specifically, after 23.8 sec from the start of the drive of the motor M, the controller 90 causes the first remaining toner amount sensor 51 and the second remaining toner amount sensor 52 to start the remaining toner amount detection and then causes the remaining toner amount panel 400 to display the remaining toner amount level on the basis of a detection result of one time (corresponding to 5 rotations). Even in a result obtained from an average value during the last 5 rotations, detection is made after the toner is flattened in the longitudinal direction, and therefore, accuracy is improved.

The processing is returned to the processing of part (a) of FIG. 10.

In the controller 90 discriminates whether or not the timer T1 is a threshold α or more. The threshold α is a preset value as described above and corresponds to a driving time of the motor M1 and the stirring member 7 in the toner supplying operation. In the case where the controller 90 discriminated in S5 that the timer T1 is less than the threshold α, the process is returned to S4. In the case where the controller 90 discriminated in S5 that the timer T1 is the threshold α or more, the controller 90 causes the processing to go to S6. In S6, the controller 90 stops the drive of the motor M1, so that the toner supplying operation is ended. For example, in the case where the threshold α is set to 30 sec, a time from the start of the drive of the motor M1 in S3 until the drive of the motor M1 is stopped in S6 is 30 sec.

In the above-described toner supplying process, when the toner falls from the toner pack 40 into the developing container 8 as shown in part (a) of FIG. 12, the toner passes through the inclined portions 37 and enters the accommodating chamber 8*a*. The supply opening 32*a* and the inclined portions 37 are disposed at one end portion of the developing container 8 in the longitudinal direction, and therefore, into the accommodating chamber 8*a*, the toner is supplied collectively toward the one end portion side.

Here, the case where the stirring member 7 is not rotated when the toner is supplied to the accommodating chamber 8*a* will be considered. In the case where the toner is dropped from the toner pack 40 into the developing container 8, when the stirring member 7 is not rotated in the accommodating chamber 8*a* for accommodating the toner, it takes time that the dropped toner spreads over an entire region with respect to the longitudinal direction of the photosensitive drum 1. When this time becomes long, a time is required until the user who performs the toner supplying operation confirms that the toner was supplied into the accommodating chamber 8*a*, so that usability is lowered.

Therefore, in the embodiment 1, the stirring member 7 is driven for a predetermined time (threshold α) from the time of the start of the (toner) supply in the toner supply processing. By this, as shown in parts (b) and (c) of FIG. 12, the toner supplied from the toner pack 40 to one end portion of the developing container 8 is early levelled off over a full length in the longitudinal direction of the accommodating chamber 8*a* of the developing container 8 by the stirring member 34. For this reason, the time until the user confirms that the toner supply was carried out is shortened, so that the usability can be improved. Further, the toner accommodated in the developing container 8 is leveled off, so that detection accuracy of the remaining amount information of the toner by the first remaining toner amount sensor 51 and the second remaining toner amount sensor 52 can be improved.

Further, during the toner supply processing, the remaining amount information of the toner in the developing container 8 is detected by the first remaining toner amount sensor 51 and the second remaining toner amount sensor 52 for each predetermined time (for example, 6.2 sec described later). For example, as shown in part (a) of FIG. 9, in a state in which the remaining toner amount panel 400 displays that the remaining toner amount is at the LOW level, the user supplies the toner from the toner pack 40 to the developing container 8. Then, the remaining toner amount panel 400 displays that the remaining toner amount is at the MID level as shown in part (b) of FIG. 9, and thereafter displays that the remaining toner amount is at the FULL level as shown in part (c) of FIG. 9. By this, the user can reliably recognize that the toner was supplied from the toner pack 40 to the developing container 8, so that the usability can be improved.

Here, the sectional views of parts (a) to (c) of FIG. 12 show the 16A-16A cross section of FIG. 3. In parts (a) and (b) of FIG. 12, arrangement of the light-emitting portion 51*a* toward one end portion of the developing container 8 with respect to the longitudinal direction (axial direction J1) of the photosensitive drum 21 is shown. More specifically, in FIG. 12, the light-emitting portion 52*a* is disposed on a side opposite from a side where the supply opening 32*a* is provided with respect to the axial direction J1. Further, the light-emitting portion 51*a,* and the light-receiving portions 51*b,* and 52*b* are also disposed at the same/substantially same longitudinal positions of the photosensitive drum 1. Due to restriction of sensor arrangement in the apparatus main assembly M, there is a case where the arrangement of the sensors is made as shown in parts (a) and (b) of FIG. 12. Also, even in such a case, by the rotation of the stirring member 7 during the toner supply, improvement in usability as described above can be realized.

Further, depending on the case, the sensors are disposed in the vicinity just under the supply opening 32*a* in some instances. In such a case, as shown in part (b) of FIG. 12, the supplied toner is localized on the left side, and it takes time until the toner surface is leveled off in the entire region of the photosensitive drum 1 with respect to the longitudinal direction in some instances. In order to detect an accurate toner supply state, there is a need that the toner surface is leveled off in the entire region of the photosensitive drum 1 with respect to the longitudinal direction. However, even in such a case, in the embodiment 1, by the rotation of the stirring member 7 during the toner supply, the toner surface is leveled off in a short time in the entire region of the photosensitive drum 1 with respect to the longitudinal direction.

In the following, a constitution in which a toner supply timing is switched depending on information on a use status of the image forming apparatus (use status history information) will be described. In the embodiment 1, an example in which the toner supply timing is changed depending on a print ratio and thus a toner fog due to toner deterioration is suppressed is described. That is, in the embodiment 1, the information on the use status corresponds to the print ratio. Referring to FIG. 13, LOW level display processing in the embodiment 1 will be specifically described. In S50, the image forming apparatus 100 is in a "READY" state, in S51, the controller 90 receives a print signal. In S52, the controller 90 starts an image forming operation (print operation). The controller 90 starts the print operation including rotation of the developing roller 4 at an appropriate timing, formation of the electrostatic latent image on the photosensitive drum 1, and the like. In S53, the controller 90 executes the remaining toner amount detection by the first remaining toner amount sensor 51 and the second remaining toner amount sensor 52, and then updates a remaining toner amount T [g].

In S54, the controller 90 updates the number of times of supply "N" (N is an integer of 1 or more) (N=1 in the case where there is no history that supply of the toner is not made even once). Incidentally, the controller 90 controls the number of times of supply "N" by for example, a counter or the like.

In S55, the controller 90 discriminates whether or not the number of times of supply is N=1 (i.e., there is no supply history even once). In the case where the controller 90 discriminated in S55 that the number of times of supply is N=1, the controller 90 causes the processing to go to S56. In S56, the controller 90 updates a pint ratio w % from installation of the image forming apparatus 100, i.e., from an initial state. In S57, the controller 90 discriminates whether or not the print ratio w % updated in S56 is less than a threshold x % which is a predetermined print ratio. In the case where the controller 90 discriminated in S57 that the print ratio w % is less than the threshold x % (less than the predetermined print ratio), the controller 90 causes the processing to go to S58.

In S58, the controller 90 discriminates whether or not the remaining toner amount T [g] updated in S53 is less than an amount A [g] which is a second threshold (remaining amount threshold). In the case where the controller 90 discriminated in S58 that the remaining toner amount T [g] is less than the amount A [g], the controller 90 causes the processing to go to S59. In S68, the controller 90 discriminates that the remaining toner amount is at the LOW level and causes the remaining toner amount panel 400 to make LOW level display as shown in part (a) of FIG. 9.

In the case where the controller 90 discriminated in S57 that the print ratio w % is the threshold x % or more (the predetermined print ratio or more), the controller 90 causes the processing to go to S60. In S60, the controller 90 discriminates whether or not the remaining toner amount T [g] is less than an amount B [g] (<A [g]) which is a first threshold (remaining amount threshold). In the case where the controller 90 discriminated in S60 that the remaining toner amount T [g] is less than the amount B [g], the controller 90 causes the processing to go to S59. In this case, the LOW level display is made as shown in part (a) of FIG. 9. Incidentally, the amount B [g] is a value used in discrimination of conventional LOW level display.

Thus, in the case where the print ratio w % is less than the threshold x %, when the remaining toner amount T [g] becomes less than the amount A [g] which is more than the amount B [g], the controller 90 causes the remaining toner amount panel 400 to display the LOW level. On the other hand, in the case where the print ratio w % is the threshold x % or more, when the remaining toner amount [g] becomes less than the amount B [g] which is less than the amount A [g], the controller 90 causes the remaining toner amount panel 400 to make the LOW level display. That is, the controller 90 switches a timing when the LOW level display is made depending on the print ratio w %, and causes the remaining toner amount panel 400 to display the LOW level at a timing earlier than the timing when the pint ratio w % is low.

In the case where the controller 90 discriminated in S55 that the number of times of supply "N" is not N=1 (i.e., supply history is present), the controller 90 causes the processing to go to S61. In S61, the controller 90 updates a print ratio v %, based on pixel count, from immediately after the last supply of the toner. Here, the term "immediately after the last supply of the toner" means that in the case where, for example, a present number of times of supply is N=2, it means immediately after first supply of the toner is made, and the print ratio v % is a value obtained on the basis of pixel count from after the first supply of the toner to a present in time.

In S62, the controller 90 discriminates whether or not the pint ratio v % is less than the threshold x %. In the case where the controller 90 discriminated in S62 that the print ratio v % is less than the threshold x %, the controller 90 causes the processing to go to S58. In the case where the controller 90 discriminated in S62 that the print ratio v % is the threshold x % or more, the controller 90 causes the processing to go to S60.

In the case where the controller 90 discriminated in S58 that the remaining toner amount T [g] is the amount A [g] or more and in the case where controller 90 discriminated in S60 that the remaining toner amount T [g] is the amount B [g], the controller 90 causes the processing to return to S50. In the case where the controller 90 discriminated in S58 that the remaining toner amount T [g] is less than the amount A [g] and in the case where the controller 90 discriminated in S60 that the remaining toner amount T [g] is less than the amount B [g], the controller 90 causes the processing to go to S59 and causes the remaining toner amount panel 400 to display the LOW level.

Thus, even on and after the number of times of supply of N=2, in the case where the print ratio v % is less than the threshold x %, when the remaining toner amount T [g] becomes less than the amount A [g] which is more than the amount B [g], the controller 90 causes the remaining toner amount panel 400 to display the LOW level. On the other hand, in the case where the print ratio v % is the threshold x % or more, when the remaining toner amount [g] becomes less than the amount B [g] which is less than the amount A [g], the controller 90 causes the remaining toner amount panel 400 to make the LOW level display. That is, even on and after the number of times of supply of N=2, the controller 90 switches a timing when the LOW level display is made depending on the print ratio v %, and causes the remaining toner amount panel 400 to display the LOW level at a timing earlier than the timing when the print ratio v % is low.

Here, in the case where a high-print ratio-image is outputted, most of the toner on the developing roller 4 is consumed and is replaced with the toner inside the developing container 8. On the other hand, a low-print ratio-image is outputted, most of the toner on the developing roller 4 is not consumed and remains on the developing roller 4 as it is, and thus is continuously subjected to sliding load by the developing blade 6 and the supplying roller 5. For this reason, in the case where the low-print pint ratio-image is outputted, compared with the case where the high-print ratio-image is outputted, toner deterioration progresses. Therefore, in the case of the low-print ratio printing, the toner in the developing container 8 decreases in amount, so that immediately before new (fresh) toner is supplied, a state in which the toner is most deteriorated is formed.

In the embodiment 1, in a use status at a low print ratio in which the toner deterioration progresses, the new toner is supplied (replenished) in a state in which the remaining toner amount of the toner in the developing container 8 is large, i.e., a state before a toner deterioration degree becomes excessively large. Thus, by carrying out control so that the deterioration degree of the toner in the developing container 8 does not become a certain degree or more, with the result that the toner fog can be suppressed. Incidentally, the remaining toner amount panel 400 is not limited to a liquid crystal panel, but may also be constituted by a light source such as an LED or an incandescent lamp, and a diffusion lens. Incidentally, in an example shown in FIG. 9, the remaining toner amount panel 400 was described as a notifying means, but is not limited thereto. For example, the display of part (a) of FIG. 9 may be display indicating that the toner supply is necessary, the display of part (b) of FIG. 9 may be display indicating that the toner supply is not necessary, and the display of part (c) of FIG. 9 may be display indicating that the toner supply was sufficiently made. Incidentally, the remaining toner amount panel 400 is only the notifying means and does not limit the operation of the apparatus main assembly M. In response to this display, the user is capable of freely selecting either one of the toner supply and continuous use without supplying the toner.

Experiment 1

Here, an experiment conducted using a comparison example in order to demonstrate an effect of the embodiment 1 will be described.

In the experiment, evaluation as to whether or not in an environment of 23° C. in temperature and 50% RH in relative humidity, when an image with a print ratio of 1% was printed to an end of a lifetime of the main assembly, the toner fog occurred was made. Conventionally, 5 times of the toner supply with the toner packs are required until the lifetime of the main assembly reaches the end thereof.

The toner fog is disadvantageous at a timing when the remaining toner amount of the toner in the developing toner 8 becomes smallest. For that reason, discrimination of the toner fog is made by measuring fog density at a timing immediately before the toner is supplied from the toner pack, and evaluation was made in 3 stages of "○" (less than 1%: no problem as an image quality), "Δ" (1% or more and less than 5%: some influence but no problem), and "x" (5% or more: with problem). For measurement of the toner fog, a reflection densitometer ("Model TC-MOR-45", manufactured by Tokyo Denshoku Co., Ltd., with use of a green filter) was used, and a reflectance (%) was measured. For the fog measurement, a tag or the like is stuck on a part of a sheet and then a solid white image is formed on the sheet, and thereafter the sheet is outputted. A reflectance at a portion where the tag is removed from the outputted sheet is taken as a reference reflectance, and the fog measurement was made. The reflectance is different depending on a measurement portion, and a difference between a measured value at a portion where the measured value becomes minimum and a measured value (reference reflectance) at a portion where the tag was stuck on the sheet and then was removed from the outputted sheet is measured as a fog value. As a numerical value of the measured fog value is smaller, an image quality for indicating that a fog amount is small is better.

In this experiment, the remaining toner amount for displaying the LOW level is set in two conditions consisting of a condition 1 and a condition 2, and in each of these conditions 1 and 2, the above-described evaluation of the toner fog was made. The condition 1 is a constitution in which the LOW level is displayed in the amount A [g] in remaining toner amount (the LOW level is displayed at an early timing), and the condition 2 is a constitution in which the LOW level is displayed in the amount B [g] (<A [g]) in remaining toner amount. The constitutions and experimental results of the condition 1 and the condition 2 are shown in table 1.

TABLE 1

| | | | TONER SUPPLY | | | | | |
|---|---|---|---|---|---|---|---|---|
| CD*[1] | EV*[2] | LL*[3] | 1ST | 2ND | 3RD | 4TH | 5TH | LT*[4] |
| 1 | 23/50 | A[g] | ○ | ○ | ○ | ○ | ○ | ○ |
| 2 | 23/50 | B[g](<A) | ○ | Δ | Δ | Δ | X | X |

*[1]"CD" is the condition.
*[2]"EV" is the environment. "23/50" is 23° C./50% RH.
*[3]"LL" is the remaining toner amount [g] during the LOW level display.
*[4]"LT" is the lifetime of the main assembly.

In the case of the constitution of the condition 2, the remaining toner amount is decreased to the amount B [g] (<A) until the toner is supplied, and therefore, the new toner is supplied in a state in which the deterioration degree of the toner in the developing container 8 progressed. Further, every time when the level of the remaining toner amount reaches the LOW level, more deteriorated toner is accumulated, and therefore, at the end of the lifetime of the main assembly, a toner fog phenomenon due to the toner deterioration becomes conspicuous.

On the other hand, in the constitution of the condition 1, the new toner is supplied at a timing when the remaining toner amount reaches the amount A [g] more than the amount B [g], i.e., in a state before the deterioration degree of the toner becomes a certain degree or more, and therefore, a state in which the toner deterioration degree is slight can be maintained. In the condition 1, compared with the condition 2, the toner is supplied early, and therefore, 6-th supply of the toner, which is more than that in the conventional constitution until the lifetime reaches the end of the lifetime of the main assembly. In the condition 1, in the case where the 6-th supply of the toner is made, a good result is obtained even when the toner is supplied in an amount corresponding to the amount in the condition 2. Accordingly, the toner fog due to the toner deterioration can be suppressed.

As described above, according to the embodiment 1, in the image forming apparatus of the toner supply type, it is possible to suppress an occurrence of the image defect due to the toner deterioration.

In the following, a constitution in which a toner supply timing is switched depending on information on a use status of the image forming apparatus 100 according to an embodiment 2 will be described. In the embodiment 2, the information on the use status corresponds to ambient temperature and humidity, specifically corresponds to a water content. The embodiment 2 is changed in display processing of the remaining toner amount panel 400 in the embodiment 1. For this reason, constitutions similar to those in the embodiment 1 will be omitted from illustration or described by adding the same reference numerals or symbols to the drawings.

LOW Level Display Processing

Referring to FIG. 14, LOW level display processing in the embodiment 2 will be specifically described. Incidentally, the processing of S61 to S64 is similar to the processing of S50 to S53, respectively, of FIG. 13 and therefore, will be omitted from description. In S65, the controller 90 detects an ambient environment by the environment detecting portion 54, and updates an absolute water content y [g/m$^3$] of the ambient environment. In S66, the controller 90 discriminates whether or not an absolute water content y [g/m$^3$] is less than a threshold z [g/m$^3$] which is a predetermined water content. In the case where the controller 90 discriminated in S66 that the absolute water content y [g/m$^3$] is less than the threshold z [g/m$^3$] (less than the predetermined water content), the controller 90 causes the processing to go to S67.

In S67, the controller 90 discriminates whether or not the remaining toner amount T [g] is less than an amount C (>A) [g] which is a fourth threshold. In the case where the controller 90 discriminated in S67 that the remaining toner amount T [g] is less than the amount C [g], the controller 90 causes the processing to go to S68. In S68, the controller 90 discriminates that the remaining toner amount is at the LOW level and causes the remaining toner amount panel 400 to make LOW level display as shown in part (a) of FIG. 9.

In the case where the controller 90 discriminated in S66 that the absolute water content y [g/m$^3$] is the threshold z

[g/m$^3$] or more (the predetermined water content or more), the controller 90 causes the processing to go to S69. In S69, the controller 90 discriminates whether or not the remaining toner amount is less than an amount B [g] (<A [g]) which is a first threshold. In the case where the controller 90 discriminated in S69 that the remaining toner amount T [g] is less than the amount B [g], the controller 90 causes the processing to go to S68, and the LOW level display is made as shown in part (a) of FIG. 9. In the case where the controller 90 discriminated in S67 that the remaining toner amount T [g] is the amount C [g] or more and in the case where controller 90 discriminated in S69 that the remaining toner amount T [g] is the amount B [g], the controller 90 causes the processing to return to S61.

Thus, in the embodiment 2, in the case where the absolute water content y [g/m$^2$] is less than the threshold z %, when the remaining toner amount T [g] becomes less than the amount C [g] which is more than the amount A [g], the controller 90 causes the remaining toner amount panel 400 to display the LOW level. On the other hand, in the case where the absolute water content y [g/m$^3$] is the threshold z % or more, when the remaining toner amount [g] becomes less than the amount B [g] which is less than the amount A [g], the controller 90 causes the remaining toner amount panel 400 to make the LOW level display. That is, in the embodiment 2, the controller 90 switches a timing when the LOW level display is made depending on the absolute water content y [g/m$^3$] and causes the remaining toner amount panel 400 to display the LOW level at a timing earlier than the timing when the absolute water content y [g/m$^3$] is low, i.e., in a low temperature/low humidity environment.

Here, in a low temperature/low humidity environment, the electric charge of the charge toner is not readily removed, so that a part of the toner carried on the developing roller 4 is excessively charged. The excessively charged toner is firmly fixed by a mirror force acting between itself and the developing roller 4, and the force thereof exceeds a regulating force of the developing blade 6, so that improper regulation which is disorder of the toner layer on the developing roller 4 occurs. Further, when the improper regulation occurs, the developer which is more than necessary is used for the development, and therefore, the amount of the toner developed from the electrostatic latent image increases on a white background portion of the image.

In the embodiment 2, in a use status in the low temperature/low humidity environment in which a toner fog due to the improper regulation is disadvantages, the new toner is supplied (replenished) in a state in which the remaining toner amount of the toner in the developing container 8 is large, i.e., a state before a toner deterioration degree becomes excessively large. Thus, by carrying out control so that the deterioration degree of the toner in the developing container 8 does not become a certain degree or more, with the result that the toner fog can be suppressed. Incidentally, in the embodiment 2, C>A holds, but this relationship may also be C=A or B<C<A.

Further, the embodiment 2 may be combined with the embodiment 1. In this case, in an instance of the low print ratio and the low temperature/low humidity environment, the toner is supplied in a state in which the remaining toner amount is largest.

Experiment 2

Here, an experiment conducted using a comparison example in order to demonstrate an effect of the embodiment 2 will be described.

In the experiment, evaluation as to whether or not in an environment of 15° C. in temperature and 10% RH in relative humidity, when an image with a print ratio of 1% was printed to an end of a lifetime of the main assembly, the toner fog occurred was made.

In this experiment, the remaining toner amount for displaying the LOW level is set in three conditions consisting of a condition 3, a condition 4, and a condition 5, and in each of these conditions 3 to 5, the above-described evaluation of the toner fog was made. The condition 3 is a constitution in which the low level is displayed in the amount C [g] in remaining toner amount. The condition 4 is a constitution, similarly as the condition 1 in the experiment 1, in which the LOW level is displayed in the amount A [g] (<C [g]) in remaining toner amount, and the condition 5 is a constitution, similarly as in the condition 2 of the experiment 1, in which the LOW level is displayed in the amount B [g] (<A [g]) in remaining toner amount. The constitutions and experimental results of the condition 3, the condition 4, and the condition 5 are shown in table 2.

TABLE 2

| | | | TONER SUPPLY | | | | | |
|---|---|---|---|---|---|---|---|---|
| CD*[1] | EV*[2] | LL*[3] | 1ST | 2ND | 3RD | 4TH | 5TH | LT*[4] |
| 3 | 15/10 | A[g] | ○ | ○ | ○ | ○ | ○ | ○ |
| 4 | 15/10 | A[g](<C) | ○ | ○ | ○ | Δ | Δ | Δ |
| 5 | 15/10 | B[g](<A) | ○ | Δ | Δ | X | X | X |

*[1]"CD" is the condition.
*[2]"EV" is the environment. "23/50" is 23° C./50% RH.
*[3]"LL" is the remaining toner amount [g] during the LOW level display.
*[4]"LT" is the lifetime of the main assembly.

Particularly, in the case of the constitution of the condition 5, an increase in mirror force due to the low temperature/low humidity environment and an increase in depositing force due to the toner deterioration are superposed, and therefore, at a timing further earlier than the timing in the experiment 1. On the other hand, in the case of the condition 3, although the increase in mirror force due to the low temperature/low humidity environment is observed, a state in which the toner deterioration degree does not become a certain degree or more can be maintained, and therefore, the toner fog can be suppressed. Incidentally, in the condition 4, compared with the condition 3, the evaluation result becomes "Δ", but does not become "x" as the condition 5. Incidentally, in the condition 4, compared with the condition 5, the toner is supplied at an early timing, and therefore, a good result is obtained compared with the condition 5.

As described above, according to the embodiment 2, in the image forming apparatus of the toner supply type, it is possible to suppress an occurrence of the image defect due to the toner deterioration.

In the following, a constitution in which a toner supply timing is switched depending on information on a use status of the image forming apparatus 100 according to an embodiment 3 will be described. In the embodiment 3, the information on the use status corresponds to the number of times of supply. The embodiment 3 is changed in display processing of the remaining toner amount panel 400 in the embodiment 1. For this reason, constitutions similar to those in the embodiment 1 will be omitted from illustration or described by adding the same reference numerals or symbols to the drawings.

LOW Level Display Processing

Referring to FIG. 15, LOW level display processing in the embodiment 3 will be specifically described. Incidentally, the processing of S70 to S74 is similar to the processing of S50 to S54, respectively, of FIG. 13 and therefore, will be omitted from description. In S75, the controller 90 updates the threshold of the remaining toner amount to an amount of N times is number of times of supply (≤amount of (N+1) times). For example, when the number of times of supply updated in S84 is N=2 times, the controller 90 updates the threshold of the remaining toner amount to a second amount [g]. Incidentally, the ROM 93 stores a table or the like in which the number of times of supply N and the amount of the N times are associated with each other, and the controller 90 updates the amount [g] of N times by reading information from the ROM93.

In S76, the controller 90 discriminates whether or not the remaining toner amount T [g] is less than the amount of N times. In the case where the controller 90 discriminated in S76 that the remaining toner amount T [g] is less than the amount [g] of N times, the controller 90 causes the processing to go to S77. In S77, the controller 90 discriminates that the remaining toner amount is at the LOW level and causes the remaining toner amount panel 400 to make LOW level display, i.e., that as shown in part (a) of FIG. 9. In the case where the controller 90 discriminated in S76 that the remaining toner amount T [g] is the amount "A [g] of N times" or more, the controller 90 causes the processing to return to S70.

The "amount [g] of N times" which is the threshold of the remaining toner amount is set so as to satisfy "amount [g] of N times)≤(amount [g] of (N+1) times". For example, a first amount [g] is A (>B), a second amount [g] becomes D (>A), a third amount [g] becomes E (>D), a fourth amount [g] becomes F (>E), . . . , and the like. Thus, in the embodiment 3, the controller 90 sets the remaining toner amount threshold to a higher value with an increasing number of times of supply, so that a timing when the LOW level is displayed is made earlier with the increasing number of times of supply.

Here, in the toner pack type, the toner is supplied to the developing container 8 in which the deterioration toner remains, and therefore, the number of times of friction becomes larger than that in a new (fresh) state. For that reason, the toner remaining in the developing container 8 when the toner becomes the LOW state again becomes a state in which the number of times of friction is more than that during last low state, i.e., in a more deteriorated state. By repeating the LOW state and the toner supply, the more deteriorated toner accumulates in the developing container 8, and therefore, as a result, a degree of occurrence of the fog due to the toner deterioration increases.

In the embodiment 3, in a use status of an increasing number of times for supply in which a toner fog due to the improper regulation is disadvantageous, the new toner is supplied (replenished) in a state in which the remaining toner amount of the toner is larger, i.e., a state before a toner deterioration degree becomes excessively large. Thus, by carrying out control so that the deterioration degree of the toner in the developing container 8 does not become a certain degree or more, with the result that the toner fog can be suppressed.

Experiment 3

Here, an experiment conducted using a comparison example in order to demonstrate an effect of the embodiment 3 will be described.

In the experiment, similarly as in the experiment 1, evaluation as to whether or not in an environment of 23° C. in temperature and 50% RH in relative humidity, when an image with a print ratio of 1% was printed to an end of a lifetime of the main assembly, the toner fog occurred.

In this experiment, the remaining toner amount in which the LOW level is displayed is set as a condition 6, and the evaluation of the toner fog was made. The condition 6 has the following constitution.

During first supply, the LOW level was displayed in the remaining toner amount A [g], During second supply, the LOW level was displayed in the remaining toner amount D [g] (>A), During third supply, the LOW level was displayed in the remaining toner amount E [g] (>D), During fourth supply, the LOW level was displayed in the remaining toner amount F [g] (>E), During fifth supply, the LOW level was displayed in a remaining toner amount G [g] (>F), and At the end of the lifetime of the main assembly, the LOW level was displayed in a remaining toner amount H [g] (>G).

Further, as comparison examples in effect, the experiment was conducted also in the condition 1 and the condition 2, and the evaluation of the toner fog was made.

The constitutions and experimental results of the condition 6, the condition 1, and the condition 2 are shown in table 3.

TABLE 3

| | | TONER SUPPLY | | | | | |
|---|---|---|---|---|---|---|---|
| CD*1 | EV*2 | 1ST | 2ND | 3RD | 4TH | 5TH | LT*4 |
| 6 | 23/50 LL*3 | A | D(>A) | E(>D) | F(>E) | G(>F) | H(>G) |
| | TF*4 | ○ | ○ | ○ | ○ | ○ | ○ |
| 1 | 23/50 LL*3 | A | A | A | A | A | A |
| | TF*4 | ○ | ○ | ○ | ○ | ○ | ○ |
| 2 | 23/50 LL*3 | A | B(<A) | B(<A) | B(<A) | B(<A) | B(<A) |
| | TF*4 | ○ | Δ | Δ | Δ | X | X |

*1"CD" is the condition.
*2"EV" is the environment. "23/50" is 23° C./50% RH.
*3"LL" is the remaining toner amount [g] during the LOW level display.
*4"TF" is the toner fog.
*5"LT" is the lifetime of the main assembly.

In the case of the constitution of the condition 2, the remaining toner amount is decreased to the amount B [g] (<A) irrespective of the number of times of supply, and therefore, the new toner is supplied in a state in which the deterioration degree of the toner in the developing container 8 progressed. Further, every time when the level of the remaining toner amount reaches the LOW level, more deteriorated toner is accumulated, and therefore, at the end of the lifetime of the main assembly, a toner fog phenomenon due to the toner deterioration becomes conspicuous.

In the constitution of the condition 1, the new toner is supplied at a timing when the remaining toner amount reaches the amount A [g] more than the amount B [g], i.e., in a state before the deterioration degree of the toner becomes a certain degree or more, and therefore, a state in which the toner deterioration degree is slighter can be maintained compared with the condition 2.

On the other hand, in the case of the constitution of the condition 6 in the embodiment 3, with the increasing number of times of supply, the new toner is supplied in a state in which the toner in a larger amount remains in the developing container 8, and therefore, the state in which the deterioration degree of the toner in the developing container 8 is slighter can be maintained.

Accordingly, the toner fog due to the toner deterioration can be suppressed. In the image forming apparatus of the toner container supply type, the occurrence of the fog due to the toner deterioration can be suppressed. Incidentally, in the table 3, in either of the condition 1 and the condition 6, in terms of the end of the lifetime of the main assembly, the evaluation result is "o", but more specifically, as regards the toner fog, the evaluation result in the condition 6 was further better than the evaluation result in the condition 1.

As described above, according to the embodiment 3, in the image forming apparatus of the toner supply type, it is possible to suppress an occurrence of the image defect due to the toner deterioration.

Information (history information) on the use status of the image forming apparatus 100 may be, for example, a toner consumption amount. In this case, the controller 90 causes the RAM 2 which is a storing means to store the number of rotations of the developing roller 4. Incidentally, the number of rotations of the developing roller 4 can also be converted into a traveling distance, so that the traveling distance may be used. On the basis of the toner consumption amount and the number of rotations of the developing roller 4, the controller 90 calculates a unit consumption amount which is a toner consumption amount per (one) rotation (or a toner consumption amount per (single) traveling distance) of the developing roller 4 from the last supplying operation. The controller 90 switches the threshold to a first threshold in the case where the unit consumption amount is a predetermined consumption amount or more and switches the threshold to a third threshold higher than the first threshold in the case where the unit consumption amount is less than the predetermined consumption amount. Even in this case, the state in which the deterioration degree of the toner in the developing container 8 is slighter can be maintained. Accordingly, the toner fog due to the toner deterioration can be suppressed. Incidentally, the number of rotations was used when the unit consumption amount was acquired, but for example, the number of rotations of the motor M1 or the number of printed sheets may be used.

Further, as the information on the use status of the image forming apparatus 100, the number of rotations of the developing roller 4 is used, and the controller 90 may set the threshold depending on the number of rotations of the developing roller 4. The controller 90 set the threshold higher with an increasing number of rotations of the developing roller 4. That is, when the number of rotations of the developing roller 4 at a certain point of time is Rx, and the number of rotations of the developing roller 4 at a time after the certain point of time is Ry (>Rx), the threshold may be set so as to satisfy:

(Remaining amount at rotation number Rx)≤(Remaining amount at rotation number Ry). The controller 90 sets the remaining amount threshold to a higher value with the increasing number of rotations of the developing roller 4. Even in this case, in the image forming apparatus of the toner supply type, it is possible to suppress an occurrence of the image defect due to the toner deterioration.

According to the present invention, in the image forming apparatus of the toner supply type, the occurrence of the image defect due to the toner deterioration can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-137616 filed on Aug. 25, 2023, which is hereby incorporated by reference herein in its entirety.

What is claimed is:

1. An image forming apparatus capable of performing a supplying operation for supplying toner from a supply container detachably mountable thereto, the image forming apparatus comprising:

an image bearing member configured to bear a toner image and to be rotatable;

a developing member configured to supply the toner to the image bearing member;

a developing container configured to accommodate the toner and provided with a supply opening through which the toner is supplied;

a detecting portion configured to detect a toner amount of the toner accommodated in the developing container;

a notifying portion configured to notify a timing to perform the supplying operation; and a controller configured to carry out control to compare the toner amount detected by the detecting portion with a threshold and to cause the notifying portion to notify the timing to perform the supplying operation when the toner amount detected by the detecting portion is smaller than the threshold, wherein the controller carries out control to set the threshold with which the toner amount detected by the detecting portion is compared to a first threshold in a case where a print ratio after the last supplying operation is a predetermined print ratio or more and to set the threshold to a second threshold higher than the first threshold in a case where the print ratio is less than the predetermined print ratio.

2. The image forming apparatus according to claim 1, further comprising:

a storing portion configured to store a number of rotations of the developing member, wherein the controller acquires a unit consumption amount which is a toner consumption amount per the number of rotations of the developing member after the last supplying operation on the basis of a toner consumption amount which is an amount of the toner consumed after the last supplying operation and the number of rotations stored in the storing portion, and carries out control so as to set the threshold to the first threshold in a case where the unit consumption amount is a predetermined consumption amount or more and to set the threshold to a third threshold higher than the first threshold in a case where the unit consumption amount is less than the predetermined consumption amount.

3. The image forming apparatus according to claim 1, further comprising:

an environment detecting portion configured to detect a water content in an ambient environment of the image forming apparatus, wherein the controller carries out control so as to set the threshold to the first threshold in a case where the water content detected by the environment detecting portion is a predetermined water content or more and to set the threshold to a fourth threshold higher than the first threshold in a case where the water content is less than the predetermined water content.

4. The image forming apparatus according to claim 1, wherein the controller carries out control so as to set the threshold to a higher value with an increasing number of times of supply which is a number of times in which the toner is supplied to the developing container.

5. The image forming apparatus according to claim 1, further comprising:

a storing portion configured to store a number of rotations of the developing member, wherein the controller carries out control so as to set the threshold to a higher value as the number of rotations becomes larger.

6. An image forming apparatus capable of performing a supplying operation for supplying toner from a supply container detachably mountable thereto, the image forming apparatus comprising:

an image bearing member configured to bear a toner image and to be rotatable;

a developing member configured to supply the toner to the image bearing member;

a developing container configured to accommodate the toner and provided with a supply opening through which the toner is supplied;

a detecting portion configured to detect a toner amount of the toner accommodated in the developing container;

a notifying portion configured to notify a timing to perform the supplying operation;

a controller configured to carry out control so as to cause the notifying portion to notify the timing to perform the supplying operation when the toner amount detected by the detecting portion is smaller than a threshold;

an environment detecting portion configured to detect a water content in an ambient environment of the image forming apparatus, wherein the controller carries out control so as to set the threshold to a first threshold in a case where the water content detected by the environment detecting portion is a predetermined water content or more and to set the threshold to a fourth threshold higher than the first threshold in a case where the water content is less than the predetermined water content, and a storing portion configured to store a number of rotations of the developing member, wherein the controller acquires a unit consumption amount which is a toner consumption amount per the number of rotations of the developing member after the last supplying operation on the basis of a toner consumption amount which is an amount of the toner consumed after the last supplying operation and the number of rotations stored in the storing portion, and carries out control so as to set the threshold to the first threshold in a case where the unit consumption amount is a predetermined consumption amount or more and to set the threshold to a third threshold higher than the first threshold in a case where the unit consumption amount is less than the predetermined consumption amount.

7. The image forming apparatus according to claim 6, wherein the controller carries out control so as to set the threshold to a higher value with an increasing number of times of supply which is a number of times in which the toner is supplied to the developing container.

8. The image forming apparatus according to claim 6, wherein the controller carries out control so as to set the threshold to a higher value as the number of rotations becomes larger.

* * * * *